United States Patent
Tanigawa et al.

(10) Patent No.: US 11,274,015 B2
(45) Date of Patent: Mar. 15, 2022

(54) FILAMENT WINDING DEVICE, AND YARN THREADING METHOD IN FILAMENT WINDING DEVICE

(71) Applicant: Murata Machinery, Ltd., Kyoto (JP)

(72) Inventors: Motohiro Tanigawa, Kyoto (JP);
Daigoro Nakamura, Kyoto (JP);
Masatsugu Goyude, Kyoto (JP);
Tetsuya Matsuura, Kyoto (JP); Hideo Shitamoto, Kyoto (JP); Tatsuhiko Nishida, Kyoto (JP); Tadashi Uozumi, Kyoto (JP); Shu Ikezaki, Kyoto (JP); Hirotaka Wada, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 232 days.

(21) Appl. No.: 16/647,584

(22) PCT Filed: Aug. 27, 2018

(86) PCT No.: PCT/JP2018/031491
§ 371 (c)(1),
(2) Date: Mar. 16, 2020

(87) PCT Pub. No.: WO2019/065031
PCT Pub. Date: Apr. 4, 2019

(65) Prior Publication Data
US 2020/0231403 A1    Jul. 23, 2020

(30) Foreign Application Priority Data

Sep. 26, 2017  (JP) .............................. JP2017-185175

(51) Int. Cl.
*B65H 57/00*  (2006.01)
*B65H 57/12*  (2006.01)
(Continued)

(52) U.S. Cl.
CPC .......... *B65H 57/12* (2013.01); *B29C 53/8016* (2013.01); *B65H 57/14* (2013.01); *B29C 53/64* (2013.01)

(58) Field of Classification Search
CPC ...... B65H 57/003; B65H 57/12; B65H 57/14; B65H 57/16; B65H 54/02; B65H 54/08;
(Continued)

(56) References Cited

U.S. PATENT DOCUMENTS 4,750,960 A * 6/1988 Bubeck ............... B25J 15/0019
156/169
2008/0197229 A1  8/2008 Uozumi et al.
(Continued)

FOREIGN PATENT DOCUMENTS

JP      06-306740 A    11/1994
JP      07-12478 U      2/1995
(Continued)

*Primary Examiner* — Emmanuel M Marcelo
(74) *Attorney, Agent, or Firm* — DLA Piper LLP (US)

(57) ABSTRACT

A filament winding device includes a supporter configured to support a liner in a rotatable manner; a yarn supplying unit configured to support bobbins; a helical winding head configured to helical-wind a fiber bundles onto the liner; and a standard thread guiding mechanism configured to form a standard thread guide channel that guides a standard thread from the bobbins to the liner, the standard thread being different from the fiber bundles and being connected to leading ends of the fiber bundles, the standard thread guiding mechanism including nozzles configured to blow the standard thread with a compressed gas, and guide tubes configured to guide the standard thread blown by the nozzles, and the nozzles and the guide tubes being disposed along a fiber bundle guide channel, and capable of taking up the standard thread from the standard thread guide channel to the fiber bundle guide channel.

17 Claims, 20 Drawing Sheets

(51) Int. Cl.
*B65H 57/14* (2006.01)
*B29C 53/80* (2006.01)
*B29C 53/64* (2006.01)

(58) Field of Classification Search
CPC ..... B29C 53/562; B29C 53/566; B29C 53/58; B29C 53/583
See application file for complete search history.

(56) References Cited

U.S. PATENT DOCUMENTS

| | | | |
|---|---|---|---|
| 2015/0053808 A1 | 2/2015 | Tanigawa et al. | |
| 2015/0283753 A1* | 10/2015 | Hatta | B29C 70/32 156/475 |
| 2016/0264375 A1* | 9/2016 | Hatta | B65H 57/16 |
| 2017/0291352 A1* | 10/2017 | Ueda | B29C 53/602 |
| 2018/0229449 A1* | 8/2018 | Ueda | B29C 70/682 |
| 2019/0275752 A1* | 9/2019 | Hannula | B29C 70/32 |
| 2020/0299098 A1* | 9/2020 | Tanigawa | B29C 63/0073 |

FOREIGN PATENT DOCUMENTS

| | | |
|---|---|---|
| JP | 2008-195000 A | 8/2008 |
| JP | 2015-030249 A | 2/2015 |
| JP | 2015-039853 A | 3/2015 |

* cited by examiner

← FIBER BUNDLE RUNNING DIRECTION
(STANDARD THREAD RUNNING DIRECTION)

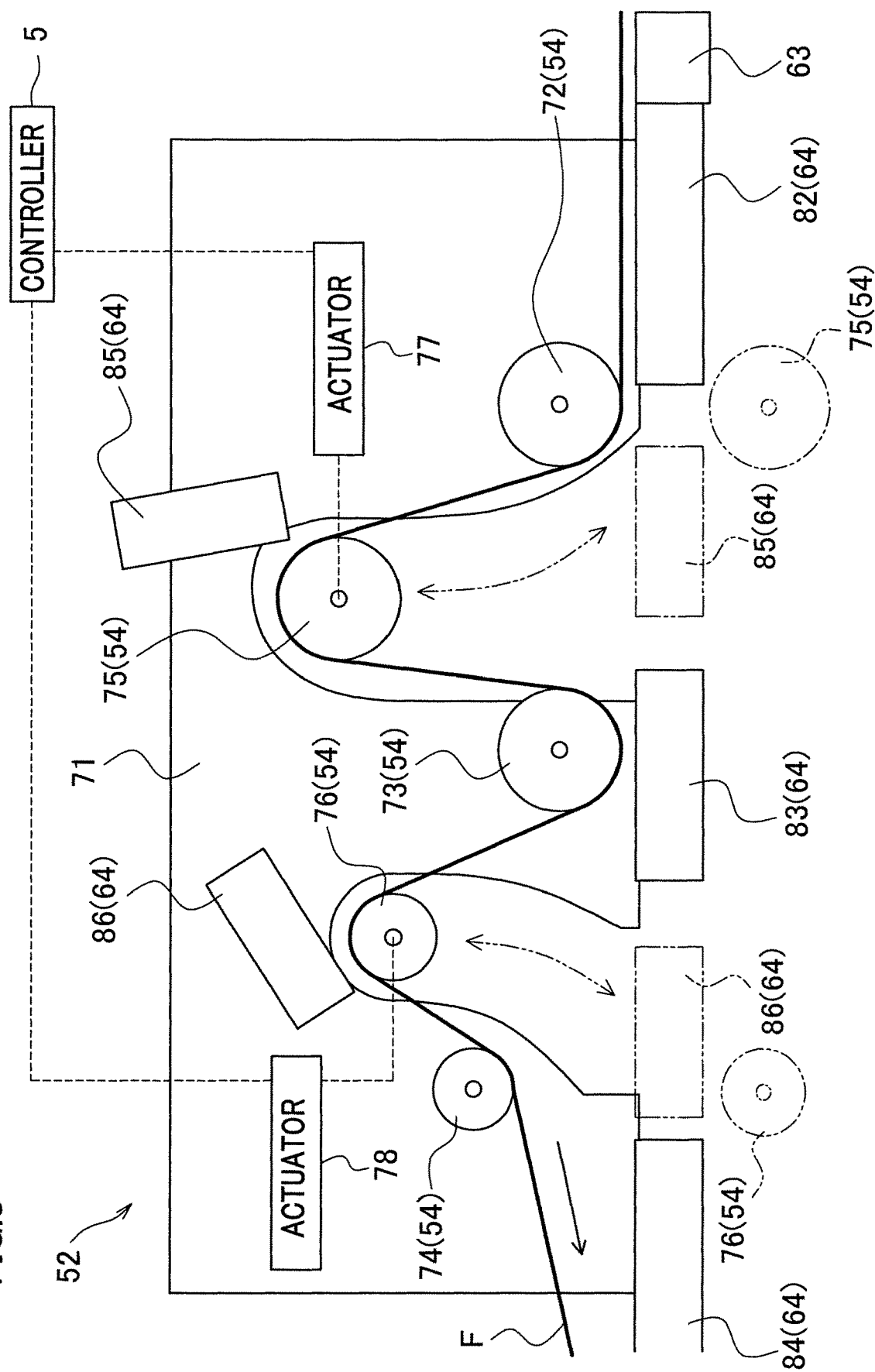

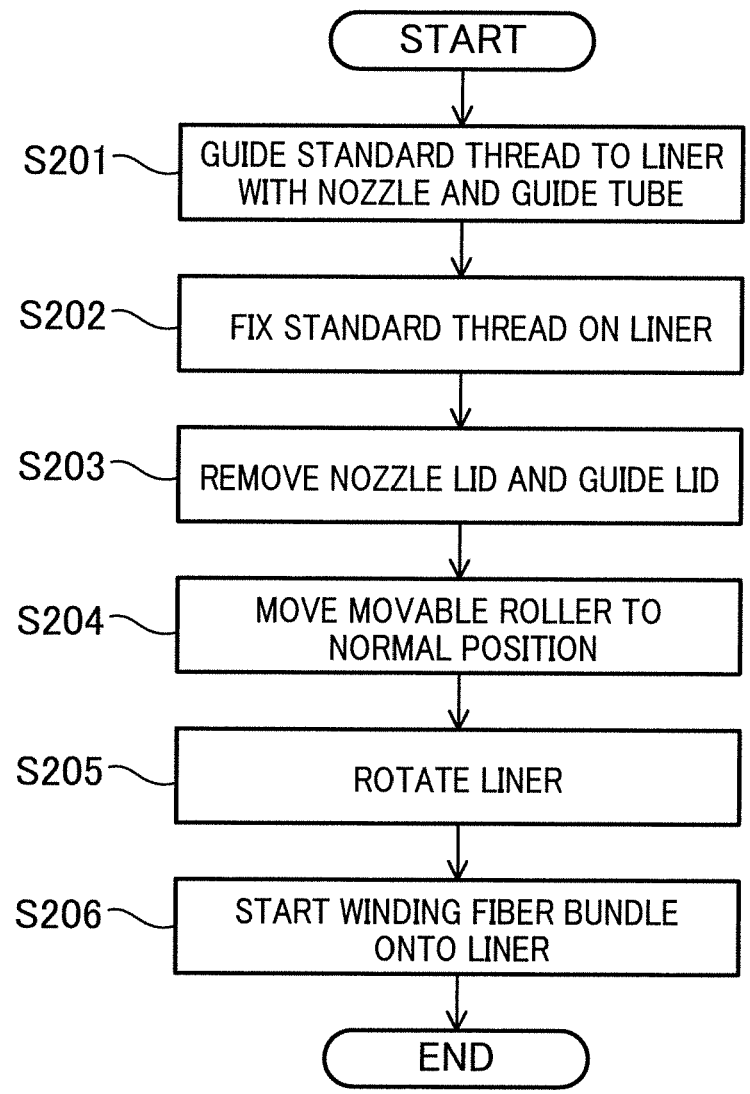

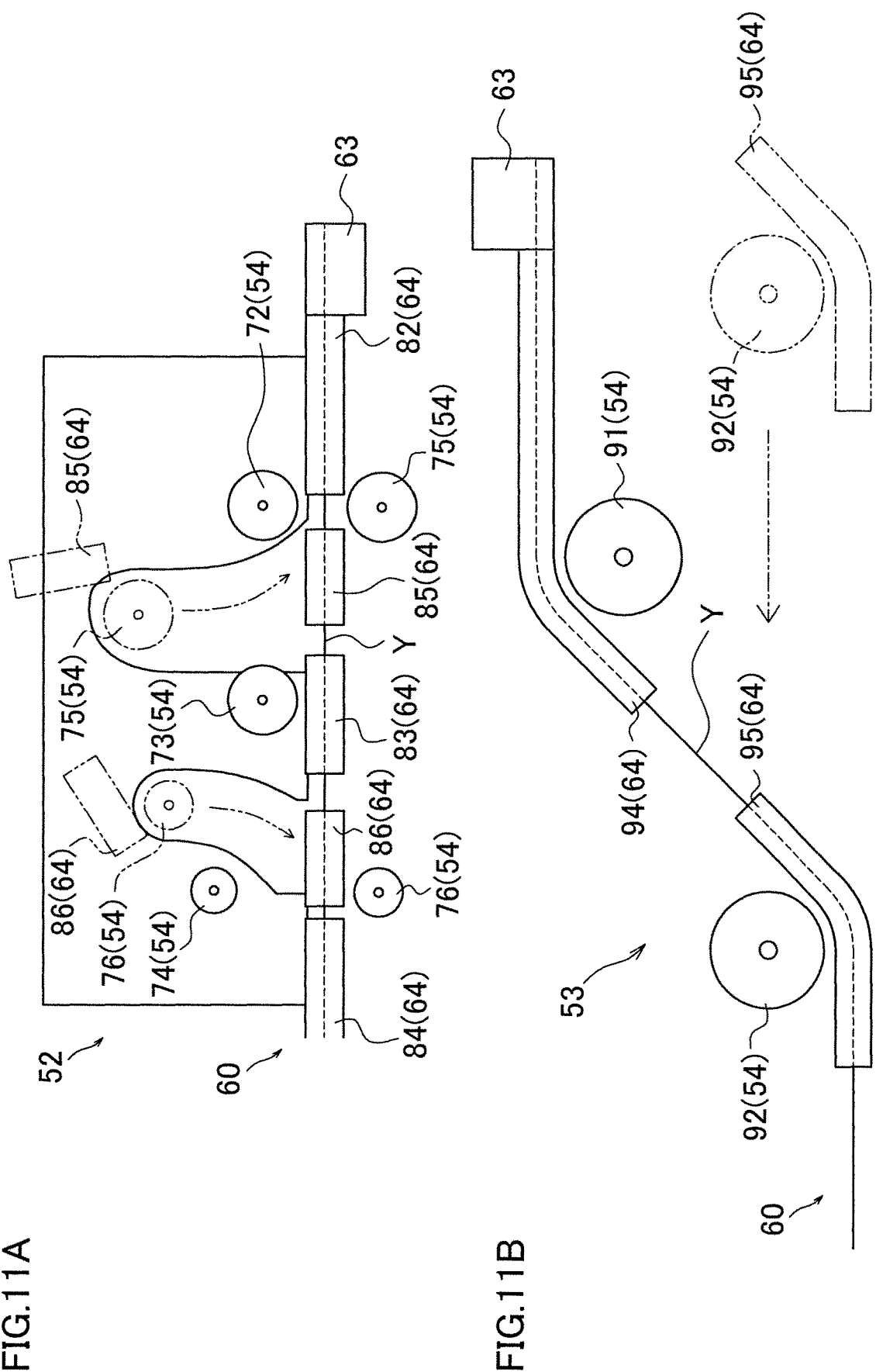

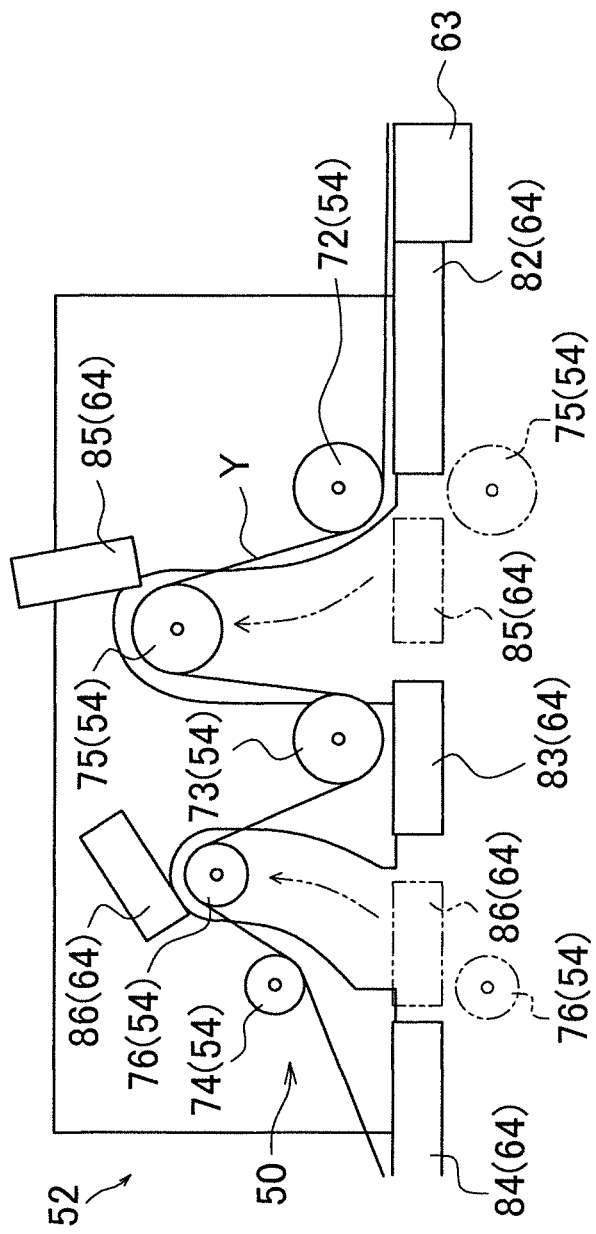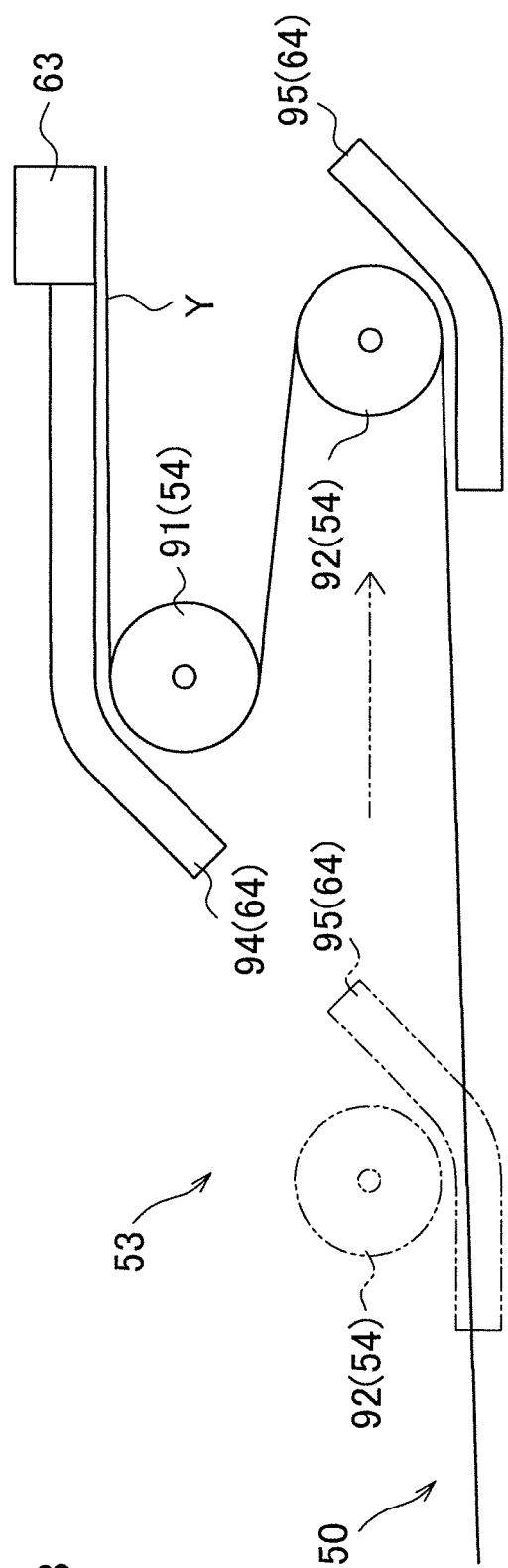
FIG.15A
FIG.15B

FIG.19
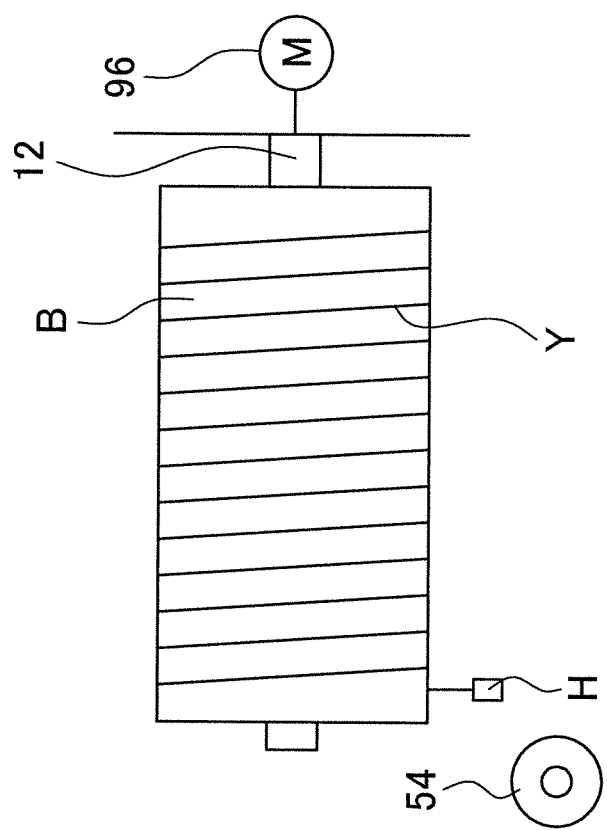
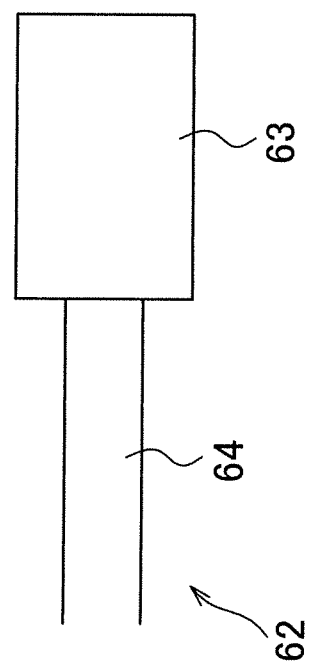

FILAMENT WINDING DEVICE, AND YARN THREADING METHOD IN FILAMENT WINDING DEVICE

TECHNICAL FIELD

This disclosure relates to a filament winding device configured to wind fiber bundles onto a liner, and a yarn threading method used in the filament winding device.

BACKGROUND

Japanese Unexamined Patent Publication No. 2008-195000 discloses a filament winding device configured to wind a fiber bundle onto a mandrel (liner). The filament winding device includes a helical winding head for helical winding onto the liner, and a supplier portion including a large number of creels (bobbins) with a plurality of wound fiber bundles to be supplied to the helical winding head. When helical winding is performed, a yarn threading operation to thread the fiber bundles to guides and the like that are disposed along a running path of the fiber bundles has to be done as a preparation to guide the many fiber bundles from the supplier portion to the liner. Such yarn threading operation is carried out manually by an operator.

It takes much effort to thread the many fiber bundles. Accordingly, approaches to achieve reduction in effort for the yarn threading operation have been considered. For instance, nozzles are disposed on the running path of the fiber bundles from the bobbins to the liner, and compressed air is supplied to the nozzles to blow the fiber bundles and guide the fiber bundles from the bobbins to the liner not by hand. Such an approach is possible. On the other hand, if the fiber bundles are blown by the nozzles, the fiber bundles become untied due to airflow, leading to much difficulty in blowing the fiber bundles from the bobbins to the liner.

It could therefore be helpful to provide a way to guide fiber bundles to a helical winding head with reliability under reduction in efforts in yarn threading operations.

SUMMARY

We thus provide:

A filament winding device including: a supporter configured to support a liner in a rotatable manner; a yarn supplying unit configured to support a bobbin onto which a fiber bundle to be wound onto the liner is wound;

a helical winding head configured to helical-wind the fiber bundle onto the liner, the fiber bundle running along a fiber bundle guide channel formed from the yarn supplying unit to the liner; a standard thread guiding mechanism configured to form a standard thread guide channel for guiding a standard thread from the bobbin to the liner, the standard thread being different in type from the fiber bundle and being connected to a leading end of the fiber bundle. The standard thread guiding mechanism includes a nozzle configured to blow the standard thread with use of a compressed gas, and a guide tube configured to guide the standard thread blown by the nozzle. The nozzle and the guide tube are disposed along the fiber bundle guide channel, and are capable of taking up the standard thread from the standard thread guide channel to the fiber bundle guide channel.

Instead of the fiber bundle, the standard thread connected to the fiber bundle may be guided to the liner along the standard thread guide channel through the nozzle and the guide tube. After the standard thread reaches the liner, the standard thread is capable of being taken up from the standard thread guide channel to be moved to the fiber bundle guide channel. Thereafter, the standard thread is pulled toward the liner, whereby the fiber bundle connected to the standard thread is capable of being drawn out and guided along the fiber bundle guide channel to the liner. Consequently, this achieves reliable guidance of the fiber bundle to the helical winding head under reduction in effort for yarn threading operation.

The filament winding device may further include a drawing device configured to take up the standard thread from the standard thread guide channel to the fiber bundle guide channel by winding the standard thread guided to the liner, and to draw out the fiber bundle, connected to the standard thread, to the liner along the fiber bundle guide channel.

The drawing device may draw out the fiber bundle, connected to the standard thread, to the liner. Accordingly, this achieves further reduction in effort for the yarn threading operation when the fiber bundle connected to the standard thread is drawn out manually.

The filament winding device may be arranged such that the supporter includes a driving unit configured to drive the liner rotationally and the drawing device corresponds to the driving unit.

The standard thread may be fixed on the liner supported by the supporter, and the liner is driven rotationally by the driving unit, whereby the standard thread is capable of being wound onto an end portion of the liner. This achieves drawing of the fiber bundle, connected to the standard thread, to the liner through rotation of the liner. Consequently, there is no need to provide an additional drawing device, leading to suppressed increase in cost.

The filament winding device may be arranged such that the nozzle includes a slit formed therein to take up the standard thread therethrough.

Such a simplified structure achieves taking up of the standard thread, guided to the liner, from the nozzle.

The filament winding device may be arranged such that the guide tube includes a slit formed therein to extend thereover in a direction where the guide tube is provided.

Such a simplified structure achieves taking up of the standard thread, guided to the liner, from the guide tube.

The filament winding device may be arranged such that the standard thread guiding mechanism is switchable between a regulated state in which the standard thread is prevented from being removed out of the standard thread guide channel and a permissive state in which the standard thread is allowed to be taken up from the standard thread guide channel.

The standard thread guiding mechanism may be kept in the regulated state from when the standard thread is blown by the nozzle until the standard thread reaches the liner. This achieves prevention of the standard thread from being removed out of the standard thread guide channel. In addition, the standard thread guiding mechanism is switched to the permissive state after the standard thread reaches the liner. This allows the standard thread to be taken up from the standard thread guide channel.

The filament winding device may be arranged such that the nozzle includes a slit formed therein through which the standard thread is capable of being taken up, and the standard thread guiding mechanism includes a nozzle lid with which the slit of the nozzle is closeable and openable.

The nozzle lid may cause the slit to close, thereby preventing removal of the standard thread out of the nozzle. Moreover, the nozzle lid causes the slit to open, thereby taking up the standard thread from the nozzle. As described above, such a simplified configuration achieves switch of the nozzles between the state in which the standard thread is prevented from removal out of the nozzle and the state in which the standard thread is capable of being taken up.

The filament winding device may be arranged such that the guide tube includes a slit formed therein to extend over the guide tube in a direction where the guide tube are provided, and the standard thread guiding mechanism includes a guide lid with which the slit of the guide tube is openable and closeable.

The guide lid may cause the slit to close, thereby preventing removal of the standard thread from the guide tube. Moreover, the guide lid causes the slit to open, thereby taking up the standard thread from the guide tube. As described above, such a simplified structure achieves switch of the guide tube between the state in which the standard thread is prevented from removal from the guide tube and the state in which the standard thread is capable of being taken up.

The filament winding device may be arranged such that the filament winding device further includes a standard thread buffer disposed on an upstream end portion of the standard thread guide channel in a standard thread running direction and is configured to store the standard thread before the standard thread is blown by the nozzle.

When, for example, the standard thread is not collected in a given area but is suspended, the standard thread may occasionally be caught or entangled on a member therearound if the standard thread is blown by the nozzle. The standard thread is blown by the nozzle while being drawn out from the standard thread buffer. Accordingly, when the channel of the standard thread is formed appropriately from the standard thread buffer to the nozzle, the standard thread is preventable from being caught or entangled on the member therearound or the like.

The filament winding device may be arranged such that the standard thread is wound onto a surface of the bobbin, and the filament winding device further includes a bobbin driving unit configured to drive the bobbin rotationally.

It is possible as an alternative device to collect the standard thread by winding the standard thread onto the surface of the bobbin where the fiber bundle is wound. On the other hand, the following disadvantage may occur. That is, since the bobbin where the fiber bundle is wound is heavy, the bobbin has difficulty in driven rotation if the standard thread is blown under compressed air supplied to the nozzle. This may lead to less unwind of the standard thread. The bobbins is driven rotationally to unwind the standard thread from the bobbin, achieving blow of the standard thread by the nozzle while being unwound from the bobbin.

The filament winding device may be arranged such that the fiber bundle guide channel includes a guide roller configured to guide the fiber bundle, the standard thread guiding mechanism includes the guide tube with a curved portion arranged along a circumferential surface of the guide roller, and the standard thread is drawable from a position of the guide tube, the position being opposite to the circumferential surface.

The curved portion of the guide tube may be disposed along the circumferential surface of the guide roller, and the standard thread is drawable from the position opposite to the guide roller. Accordingly, the standard thread is movable from the guide tube on the standard thread guide channel to the guide roller on the fiber bundle guide channel. Consequently, the standard thread can be prevented from being off from the guide roller when the standard thread is moved.

The filament winding device may be arranged such that a fixed roller whose positions is fixed and a movable roller is disposed on the fiber bundle guide channel, the movable roller being disposed on an upstream side or a downstream side of the fixed roller in a fiber bundle running direction and being movable with respect to the fixed roller, the standard thread guiding mechanism includes a fixed guide tube whose position is fixed with respect to the fixed roller and movable guide tube movable integrally with the movable roller, the movable roller is movable between a normal position where the fiber bundle is guided and a standard thread guiding position where an end portion of the movable guide tube adjacent to the fixed guide tube in the fiber bundle running direction faces an end portion of the fixed guide tube adjacent to the movable guide tube in the fiber bundle running direction, and the movable rollers is moved from the standard thread guiding position to the normal position, whereby the standard thread is movable from the standard thread guide channel to the fiber bundle guide channel.

The movable roller may be moved to the standard thread guiding position together with the movable guide tube, whereby the end portion of the fixed guide tube faces the end portion of the movable guide tube, and the standard thread guide channel is formed. Consequently, even if the fiber bundle guide channel is complicated, the designed position of the movable guide tube achieves the simplified standard thread guide channel. In addition, the standard thread is guided to the liner, and thereafter the movable roller returns to the normal position, whereby the fiber bundle guide channel is formed. As a result, the standard thread is efficiently movable to the fiber bundle guide channel.

The filament winding device may be arranged such that the standard thread has a length equal to or larger than a length of the standard thread guide channel.

If the standard thread has a length smaller than the length of the standard thread guide channel, the fiber bundle is partially on the standard thread guide channel when the leading end of the standard thread reaches the liner. Consequently, the fiber bundle may be damaged due to contact to the nozzle or the guide tube. Moreover, the fiber bundles is necessarily unwound from the bobbins to guide the fiber bundles to the liner by the standard thread guiding mechanism. Since the bobbins where the fiber bundles is wound is heavy, it is difficult to rotate the bobbin when the standard thread is blown under compressed air supplied to the nozzle. The standard thread is guided over the standard thread guide channel entirely to the liner. Consequently, the fiber bundles is capable of being guided to the liner along the fiber bundle guide channel without any contact to the nozzle or the guide tube. As a result, this achieves prevention of damages on the fiber bundle caused by contact to the nozzles or the guide tube. Moreover, there is no need to blow the standard thread together with the fiber bundle and, accordingly, there is no need to cause the heavy bobbin to rotate when the standard thread is blown. Therefore, the standard thread is easily reachable to the liner by the nozzle.

A yarn threading method used in a filament winding device includes: a helical winding head for helical winding of a fiber bundle onto a liner; and a supporter configured to support a bobbin where the fiber bundle to be supplied to the helical winding head is wound. The method of threading the fiber bundle on a fiber bundle guide channel for guiding the fiber bundle from the bobbin to the liner prior to winding of the fiber bundle onto the liner by the helical winding head includes: a standard thread guiding step of guiding a standard thread, different in types from the fiber bundle and connected to a leading end of the fiber bundle, to the liner with a standard thread guiding mechanism including a nozzle configured to blow the standard thread by a compressed gas and a guide tube configured to guide the standard thread blown by the nozzle; a standard thread moving step of taking up the standard thread, guided to the liner along a standard thread guide channel formed by the standard thread guiding mechanism, from the nozzle and the guide tube and moving the standard thread from the standard thread guide channel to the fiber bundle guide channel; and a fiber bundle drawing step of pulling the fiber bundle to the liner by drawing out the standard thread guided to the liner.

Consequently, the method achieves reliable guidance of the fiber bundle to the helical winding head under reduction in effort for yarn threading operation.

In the yarn threading method in the filament winding device, the standard thread moving step is completed before the fiber bundle connected to the standard thread is pulled on the standard thread guide channel to enter the nozzle when the standard thread is pulled toward the liner in the fiber bundle drawing step.

When the standard thread is pulled in the fiber bundle drawing step, if the fiber bundle connected to the standard thread enters the nozzle or the guide tube, the fiber bundle may be damaged when the fiber bundle enters the nozzle or the guide tube or when the fiber bundles is taken up from the nozzle or the guide tubes. Consequently, it is preferred that the fiber bundles is rather pulled on the fiber bundle guide channel where the fiber bundle originally run and is guided to the liner. The standard thread is completely moved to the fiber bundle guide channel before the fiber bundle enters the nozzle, whereby the leading end of the fiber bundles is moved to the fiber bundle guide channel together with the standard thread. As a result, this achieves prevention of the fiber bundle from entering the nozzle or the guide tube, leading to prevention of damages on the fiber bundle caused by contact to the nozzle or the guide tube.

In the yarn threading method in the filament winding device, the fiber bundle drawing step is at least partially performed along with the standard thread moving step by winding the standard thread guided to the liner.

The standard thread guided to the liner may be wound, whereby the standard thread is movable from the standard thread guide channel to the fiber bundle guide channel while the standard thread is tensioned, and the fiber bundle connected to the standard thread is drawable toward the liner. In such a manner as above, the fiber bundle drawing step is at least partially performed along with the standard thread moving step, whereby reduction in work time is obtainable.

In the yarn threading method in the filament winding device, the standard thread moving step may be completed before the fiber bundle drawing step is started.

The fiber bundle drawing step may be performed after the standard thread is completely moved from the standard thread guide channel to the fiber bundle guide channel. Consequently, this achieves reliable prevention of the fiber bundle from contacting the nozzle and the guide tube.

BRIEF DESCRIPTION OF THE DRAWINGS

FIG. 8 is an explanatory view of a tension applying unit.
FIG. 10 is a flow diagram illustrating yarn threading operation.
FIG. 11 is an explanatory view of the tension applying unit and the slack removing unit when movable rollers are disposed in a standard thread guiding position.
FIGS. 15A and 15B are explanatory views of the tension applying unit and the slack removing unit when the movable rollers return to a normal position.
FIG. 19 is a schematic diagram showing a bobbin supporter and its surroundings according to a modification.

REFERENCE SIGNS LIST

Figure 1:
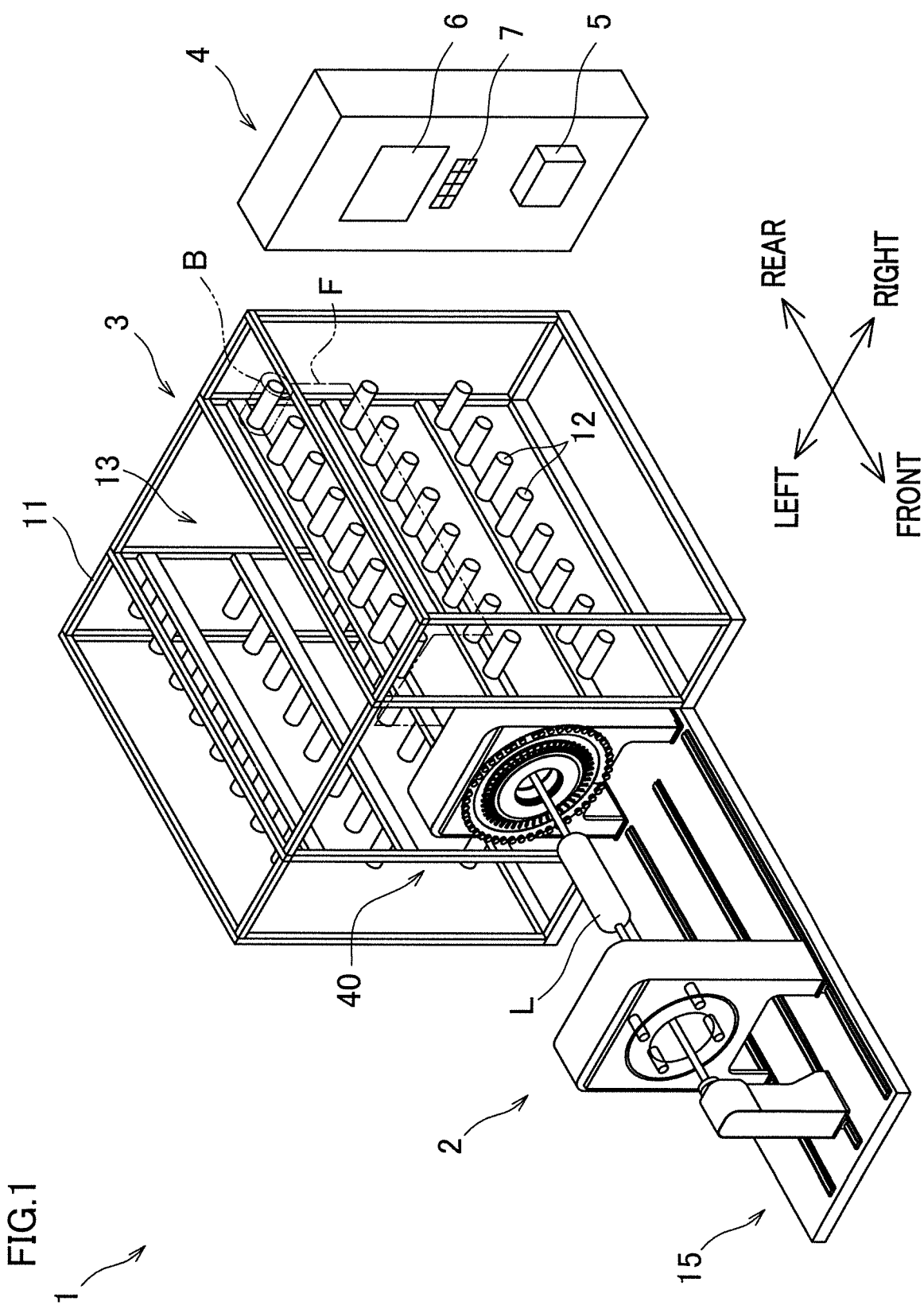
FIG. 1 is a perspective view of a filament winding device of an example.

1: filament winding device
12: bobbin supporter (yarn supplying unit)
20: supporting unit (supporter)
25: rotating motor (driving unit, drawing device)
40: helical winding unit (helical winding head)
50: fiber bundle guide channel
54: guide roller
60: standard thread guide channel
61: standard thread buffer
62: standard thread guiding mechanism
63: nozzle
63e: slit
64: guide tube
64b: slit
65: nozzle lid
67: guide lid
72, 73, 74: fixed roller
75, 76: movable roller
82, 83, 84: fixed guide tube
85, 86: movable guide tube
F: fiber bundle
L: liner
Y: standard thread

DETAILED DESCRIPTION

The following will describe an example with reference to FIGS. 1 to 18. The direction in FIG. 1 will be referred to as a front-rear direction and a left-right direction for convenience of explanation. Moreover, a direction orthogonal to the front-rear direction and the left-right direction will be referred to as an up-down direction in which gravity acts.

Schematic Structure of Filament Winding Device

First, the following describes a schematic structure of a filament winding device 1 with reference to FIG. 1. The filament winding device 1 includes a winder 2, a creel stand 3, and a control panel 4.

The winder 2 is a device configured to wind fiber bundles F onto a liner L. Each fiber bundle F is formed by, for example, impregnating a fiber material such as carbon fiber with thermosetting synthetic resin material. The liner L onto which the fiber bundles F are to be wound is made from high-strength aluminum and the like for use as a pressure tank, for example. The liner L includes a cylindrical portion, dome portions formed on both ends of the cylindrical portion, and small-diameter caps. The details of the winder 2 will be described later.

The creel stand 3 is a stand that supplies the fiber bundles F to a helical winding unit 40 to be described later. The creel stand 3 includes a supporting frame 11, a plurality of (e.g., 180) bobbin supporters 12 (corresponding to the yarn supplying unit) supported on the supporting frame 11. The supporting frame 11 is provided substantially symmetrically. Moreover, an installation space 13 is formed at a center area of the supporting frame 11 in the left-right direction. In the installation space 13, a part of the winder 2 is installed (illustration of the details inside of the installation space 13 is omitted). The bobbin supporters 12 support the bobbins B (only one thereof is shown in FIG. 1) onto which the fiber bundles F to be supplied to the helical winding unit 40 are wound in a rotatable manner, respectively.

The control panel 4 includes a controller 5, a display 6, and an operation unit 7. The controller 5 controls operation of each element of the winder 2. The display 6 displays conditions and the like for winding the fiber bundles onto the liner L by the winder 2. The operation unit 7 includes an operation button, not illustrated, that is used when an operator inputs the winding conditions by the winder 2 to the controller 5.

Structure of Winder

Figure 2:
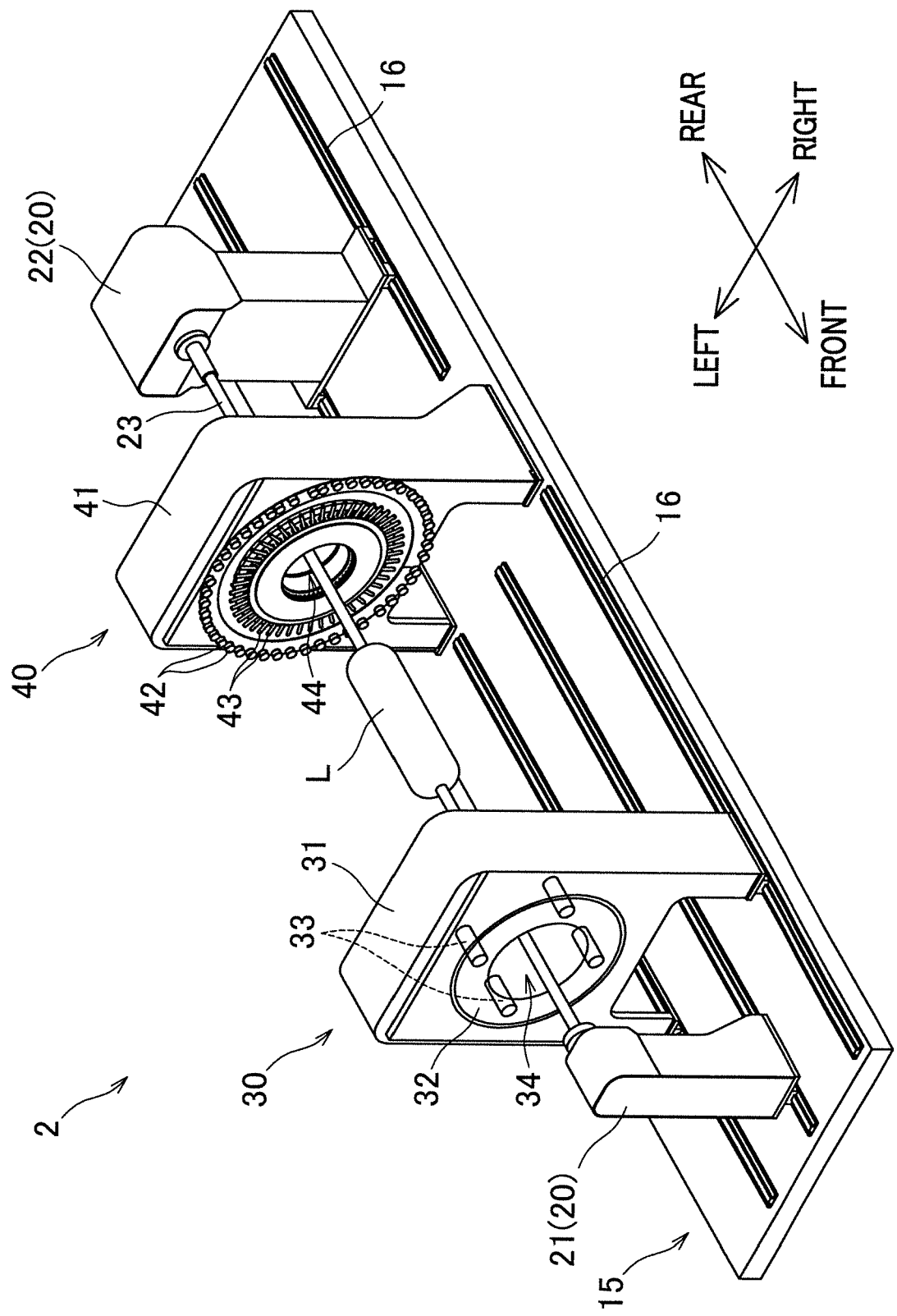
FIG. 2 is a perspective view of a winder.
Figure 3:
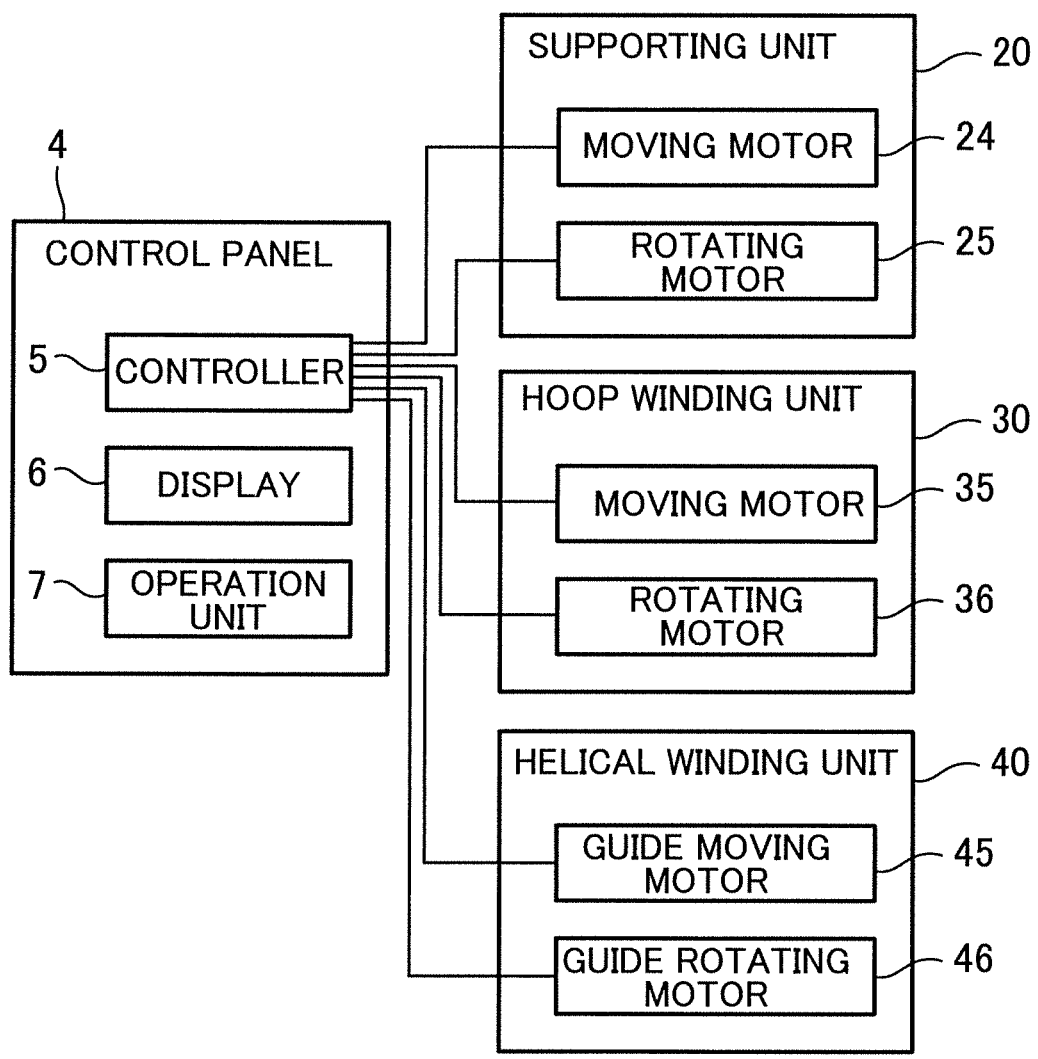
FIG. 3 is a block diagram showing an electric configuration of the filament winding device.

The following describes the structure of the winder 2 with reference to FIGS. 2 and 3. The winder 2 includes a base 15, a supporting unit 20 (corresponding to the supporter, a first supporting unit 21, and a second supporting unit 22), a hoop winding unit 30, and a helical winding unit 40 (corresponding to the helical winding head).

The base 15 is configured to support the supporting unit 20, the hoop winding unit 30, and the helical winding unit 40. The base 15 extends in the front-rear direction. On the base 15, the first supporting unit 21, the hoop winding unit 30, the helical winding unit 40, and the second supporting unit 22 are provided in line in this order from the front-side in the front-rear direction. Moreover, on the top surface of the base 15, rails 16 are provided to extend in the front-rear direction. The supporting unit 20 and the hoop winding unit 30 are provided on the rails 16 and are capable of reciprocating in the front-rear direction along the rails 16. The helical winding unit 40 is fixed to the base 15 at a front end portion of the installation space 13 of the creel stand 3 (see FIG. 1).

The supporting unit 20 includes the first supporting unit 21 provided in front of the hoop winding unit 30 and the second supporting unit 22 provided behind the helical winding unit 40. The supporting unit 20 supports the liner L such that the liner L is rotatable around a supporting shaft 23 extending in the front-rear direction. The supporting unit 20 includes a moving motor 24 configured to cause the supporting unit 20 to move along the rails 16 in the front-rear direction, and a rotating motor 25 (corresponding to the driving unit) configured to cause the liner L to rotate (see FIG. 3). The moving motor 24 and the rotating motor 25 are driven and controlled by the controller 5.

The hoop winding unit 30 is configured to perform hoop-winding onto the liner L (wind the fiber bundles onto the liner L at substantially a right angle with respect to an axial direction of the liner L). The hoop winding unit 30 includes a main body 31, and a rotating member 32. The main body 31 is provided on the rails 16 and supports the rotating member 32 such that the rotating member 32 is rotatable about the axis of the liner L. The rotating member 32 is cylindrical in shape. At a central portion of the rotating member 32 in a radial direction thereof, a circular passing hole 34 is formed to allow the liner L to pass therethrough. A plurality of bobbins 33 onto which the fiber bundles are wound respectively are attached to the hoop winding unit 30. The bobbins 33 are arranged at equal intervals in the circumferential direction of the rotating member 32.

As shown in FIG. 3, the hoop winding unit 30 includes a moving motor 35 configured to cause the hoop winding unit 30 to move along the rails 16 in the front-rear direction, and a rotating motor 36 configured to cause the rotating member 32 to rotate. The moving motor 35 and the rotating motor 36 are driven and controlled by the controller 5. The controller 5 causes the rotating member 32 to rotate while causing the hoop winding unit 30 to reciprocate along the rails 16 such that the liner L passes through a passing hole 34 relatively. As a result, the bobbins 33 revolve around an axis of the liner L, and the fiber bundles are drawn from the bobbins 33. The drawn fiber bundles are hoop-wound simultaneously onto the surface of the liner L.

The helical winding unit 40 is configured to perform helical winding onto the liner L (wind the fiber bundles F onto the liner L in a direction substantially parallel with respect to the axial direction of the liner L). The helical winding unit 40 includes a main body 41, a plurality of guides 42, and a plurality of nozzles 43. The main body 41 is erected on the base 15. At a central portion of the main body 41 in the left-right direction, a circular passing hole 44 is formed to allow the liner L to pass therethrough in the front-rear direction. The guides 42 and the nozzles 43 are provided along the circumference direction of the passing hole 44. The fiber bundles F drawn from the bobbins B provided at the creel stand 3 are led into the nozzles 43 via the guides 42. As the nozzles 43 extend in a radial direction of the liner L, the fiber bundles F are guided inwardly from the outside in the radial direction. Each of the nozzles 43 includes a plurality of tubular members which is coaxial, nested, and different in diameter. This allows the nozzles to contract in the radial direction and rotate around a longitudinal direction of the nozzles 43 as a rotational axis direction.

As shown in FIG. 3, the helical winding unit 40 includes a guide moving motor 45 configured to cause the nozzles 43 to move, and a guide rotating motor 46 configured to cause the nozzles 43 to rotate. The guide moving motor 45 and the guide rotating motor 46 are driven and controlled by the controller 5. The controller 5 moves the nozzles 43 in the radial direction of the liner L in accordance with the outer shape of the liner L while causing the supporting unit 20 to reciprocate along the rails 16 so that the liner L passes through the passing hole 44. As a result, the fiber bundles F drawn out from the nozzles 43 are simultaneously helical-wound onto the surface of the liner L.

To start the winding operation of the fiber bundles F onto the liner L by the winder 2, an operator first fixes yarn ends of the fiber bundles F to the liner L with a tape and the like, for example. After the yarn ends of the fiber bundles F are fixed on the liner L, the controller 5 is driven to control motors 24, 25, 35, 36, 45, and 46 (see FIG. 3) individually. Accordingly, this allows the hoop winding unit 30 to perform hoop-winding onto the liner L supported on the supporting unit 20 and allows the helical winding unit 40 to perform helical winding.

Before the winding operation of the fiber bundles F to the liner L is performed, there needs to thread the fiber bundles F onto guide members and the like that are disposed along the running path of the fiber bundles F (i.e., yarn threading operation) while the fiber bundles F are drawn out from the bobbins B. As described above, the great number of fiber bundles F are helical-wound onto the liner. For instance, 180 fiber bundles F need to be guided to the liner. In addition, the running path of the fiber bundles F is not linear but curved (see, for example, FIG. 1). Accordingly, yarn threading has to be done to the many guides until the fiber bundles F reach from the bobbins B to the liner L. As a result, it takes much effort to carry out the yarn threading operation of the fiber bundles F manually. Consequently, the filament winding device 1 includes the following structure to achieve reliable guidance of the fiber bundles F to the helical winding unit under reduction in effort for the yarn threading operation.

Fiber Bundle Guide Channel and Standard Thread Guide Channel

Figure 4A:
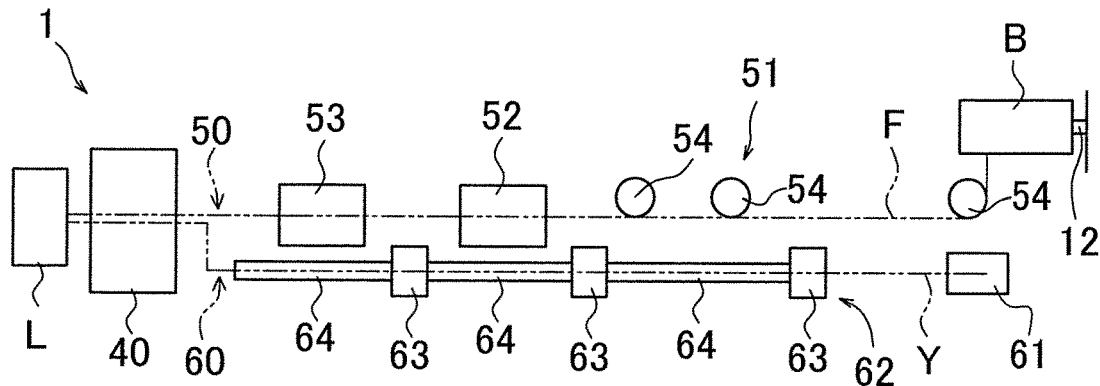
FIGS. 4A to C are schematic diagrams of a fiber bundle guide channel and a standard thread guide channel.
Figure 4B:
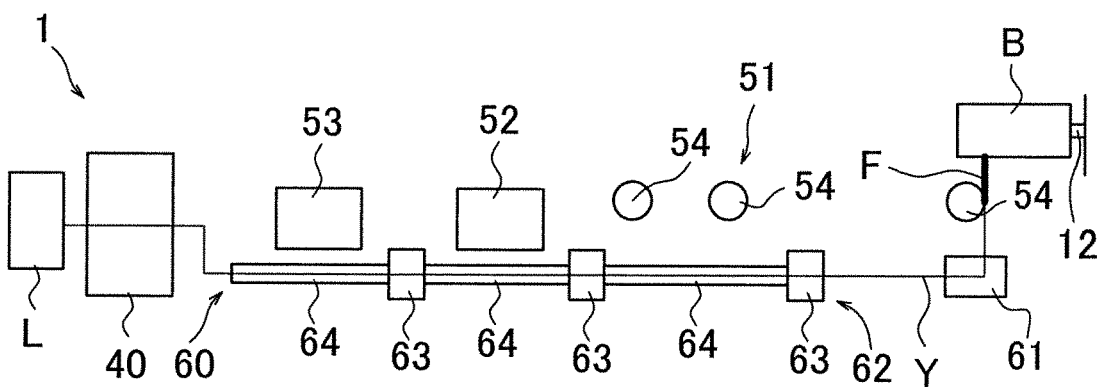
Figure 4C:
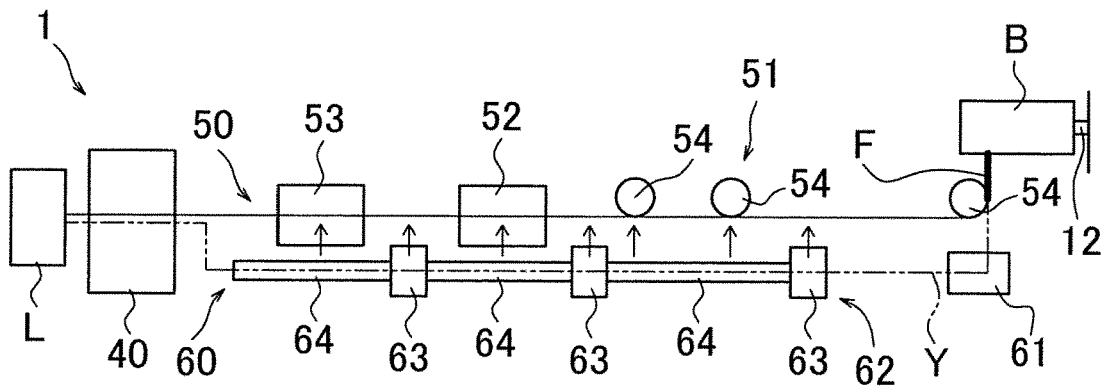

The following describes a typical structure for easy yarn threading operation with reference to FIGS. 4A to 4C. FIG. 4A is an explanatory view showing a fiber bundle guide channel 50 where one of the fiber bundles F is guided from the bobbin B to the liner L and a standard thread guide channel 60 where a standard thread Y (details described later) corresponding to the one of the fiber bundles F is guided to the liner L. FIG. 4B illustrates a condition where the standard thread Y is guided along the standard thread guide channel 60. FIG. 4C illustrates a condition after the standard thread Y is moved from the standard thread guide channel 60 to the fiber bundle guide channel 50. The actual fiber bundle guide channel 50 and the actual standard thread guide channel 60 are curved, but FIGS. 4A to C schematically show the fiber bundle guide channel 50 and the standard thread guide channel 60 substantially linearly for simplified illustration. In the following description, a direction where the fiber bundle F run is referred to as a fiber bundle running direction. Moreover, a direction where the standard thread Y runs is referred to as a standard thread running direction. Since the fiber bundle running direction is substantially the same as the standard thread running direction, FIGS. 4A to 4C shows the directions with the same arrow.

The fiber bundle guide channel 50 is a channel that guides the fiber bundle F when the fiber bundles F is helical-wound onto the liner L. As shown in FIGS. 4A to 4C, a fiber bundle guide unit 51, a tension applying unit 52, and a slack removing unit 53, for example, are arranged on the fiber bundle guide channel 50.

The fiber bundle guide unit 51 is capable of guiding the fiber bundle F toward a downstream side in the fiber bundle running direction. The fiber bundle guide unit 51 includes a plurality of guide rollers 54 configured to guide the fiber bundle F. The tension applying unit 52 applies given tension to the fiber bundle F. The slack removing unit 53 suppresses generation of slack in the fiber bundle F. Both the tension applying unit 52 and the slack removing unit 53 include a plurality of guide rollers 54 (which illustration is omitted in FIGS. 4A to 4C). The guide rollers 54 of the tension applying unit 52 and the slack removing unit 53 include one whose position is fixed and one whose position is unfixed (whose detailed description will be given later).

The standard thread guide channel 60 is a channel that guides the standard thread Y to the liner L before the fiber bundle F is guided to the fiber bundle guide channel 50. The yarn threading operation according to this example is operation during which the standard thread Y is guided to the liner L along the standard thread guide channel 60 (see FIG. 4B), the standard thread Y is moved from the standard thread guide channel 60 to the fiber bundle guide channel 50 (see FIG. 4C), and the fiber bundle F connected to the standard thread Y is guided to the liner L along the fiber bundle guide channel 50.

The standard thread guide channel 60 is formed along the fiber bundle guide channel 50. On the standard thread guide channel 60, a standard thread buffer 61 configured to store the standard thread Y and a standard thread guiding mechanism 62 configured to blow the standard thread Y to the liner L with a force of compressed air, for example, are disposed. The standard thread guiding mechanism 62 includes a plurality of nozzles 63 configured to blow the standard thread Y with compressed air, and a plurality of guide tubes 64 configured to guide the standard thread Y blown by the nozzles 63. Note that, although FIGS. 4A to 4C show three nozzles 63 and three guide tubes 64, the numbers of the nozzles 63 and the guide tubes 64 are not limited to this. The standard thread guiding mechanism 62 is configured to take up the standard thread Y from the standard thread guide channel 60 to the fiber bundle guide channel 50 (see plural two-dot chain line arrows in FIG. 4C, details described later.)

Standard Thread

The standard thread Y will be described. The standard thread Y is a yarn guided to the liner L prior to the fiber bundle F in the yarn threading operation. The standard thread Y differs in type from the fiber bundle F. Moreover, the standard thread Y is, for example, formed by a cotton yarn for kite strings or the like or a gut for fishing lines or the like, and thus light and is unlikely to be untied. The standard thread Y is not impregnated with resin and the like. One end portion of the standard thread Y is connected to the leading end of the fiber bundle F. Other end portion of the standard thread Y is connected to a head H for easy blow of the standard thread Y by the nozzles 63 (see FIG. 5). The standard thread Y is longer than the standard thread guide channel 60.

The following describes the reason why the standard thread guiding mechanism 62 does not blow the fiber bundle F directly but blows the standard thread Y instead of the fiber bundle F. First, since the bobbin B where the fiber bundle F is wound is heavy, the bobbin B has difficulty in drive rotation if the fiber bundle F is blown under compressed air supplied to the nozzles 63. This may lead to less unwind of the fiber bundle F from the bobbin B. Moreover, if the fiber bundle F impregnated with the resin is blown by the nozzles 63, the resin is attached to the nozzles 63 and the guide tubes 64. Accordingly, it becomes difficult to clean the nozzles 63 and the guide tubes 64. Moreover, the fiber bundle F itself may be attached to the guide tubes 64 to be clogged in midstream. As a result, it becomes difficult to blow the fiber bundle F impregnated with the resin by the standard thread guiding mechanism 62. In addition, if the fiber bundle F is blown by the nozzles 63 without being impregnated with the resin, the fiber bundle F become untied due to airflow, leading to much difficulty in blowing the fiber bundles F. From the reasons as above, this example adopts the standard thread Y that is light and easy to be blown, unlikely to be attached to the guide tubes 64 and the like, and unlikely to be united due to airflow caused by the nozzles 63.

Structural Element on Fiber Bundle Guide Channel and Standard Thread Guide Channel The following describes structural elements on the fiber bundle guide channel 50 and the standard thread guide channel 60 with reference to FIGS. 5 to 9.

Figure 5:
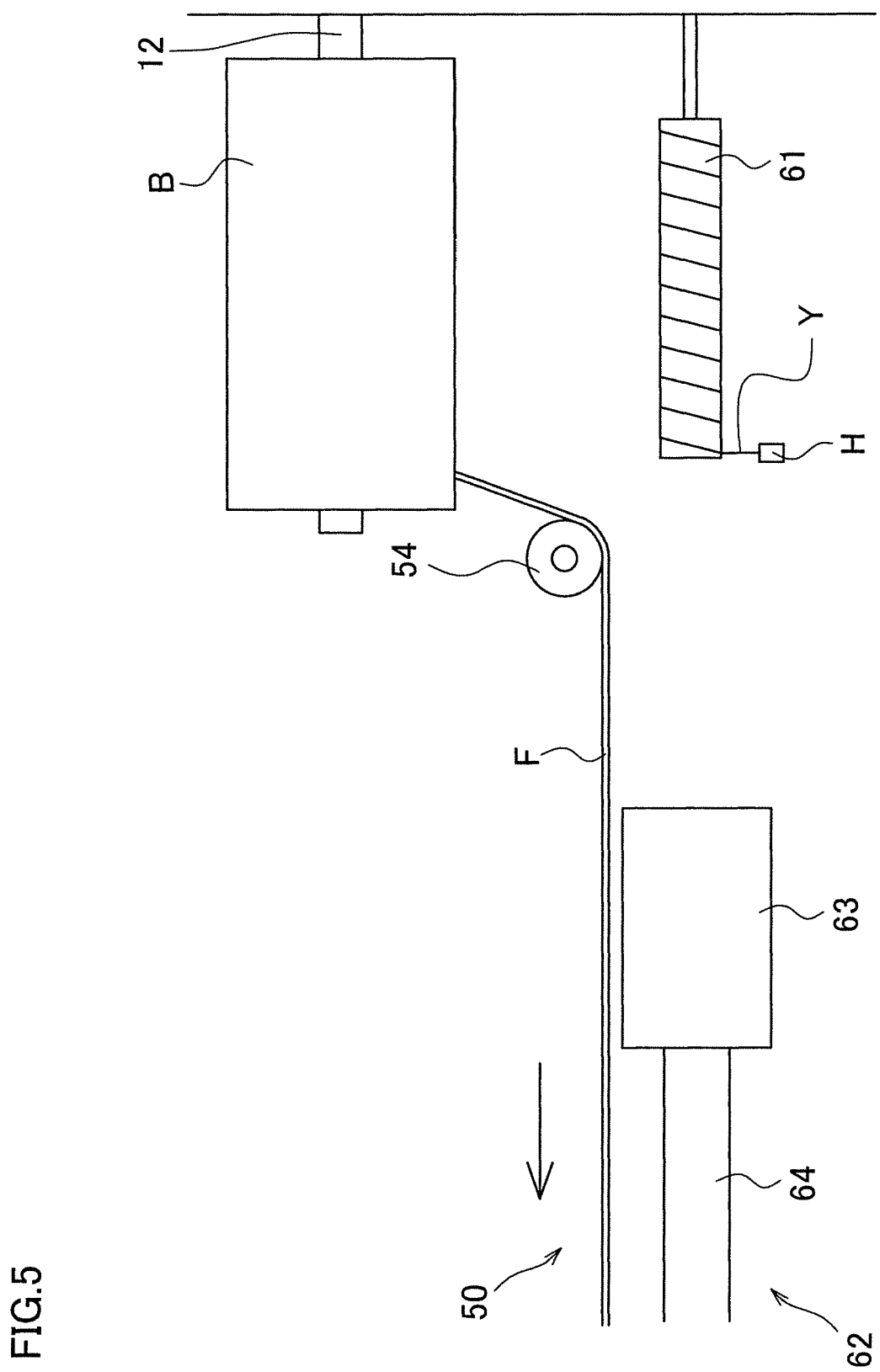
FIG. 5 is a schematic diagram showing surroundings of a bobbin supporter.

First, the structure around the bobbin supporters 12 will be described with reference to FIG. 5. FIG. 5 shows the condition where the fiber bundle F is wound onto the liner L (hereinafter, referred to as in normal operation). To the bobbin supporter 12, a bobbin B is attached. Close to the bobbin supporter 12, the standard thread buffer 61 is arranged. The standard thread buffer 61 is, for example, a round-bar member that is fixed on the supporting frame 11 (see FIG. 1) of the creel stand 3. Otherwise, the standard thread buffer 61 is rotatably supportable by the supporting frame 11. In the standard thread buffer 61, the standard thread Y is collected.

The standard thread guiding mechanism 62 will be described. On a downstream side from the standard thread buffer 61 in the yarn running direction, the standard thread guiding mechanism 62 is arranged. The standard thread guiding mechanism 62 includes a plurality of nozzles 63 and a plurality of guide tubes 64. The standard thread guiding mechanism 62 blows the standard thread Y by the nozzles 63 through which the compressed air is supplied, and guides the blown standard thread Y to the liner L via the guide tubes 64.

Figure 6A:
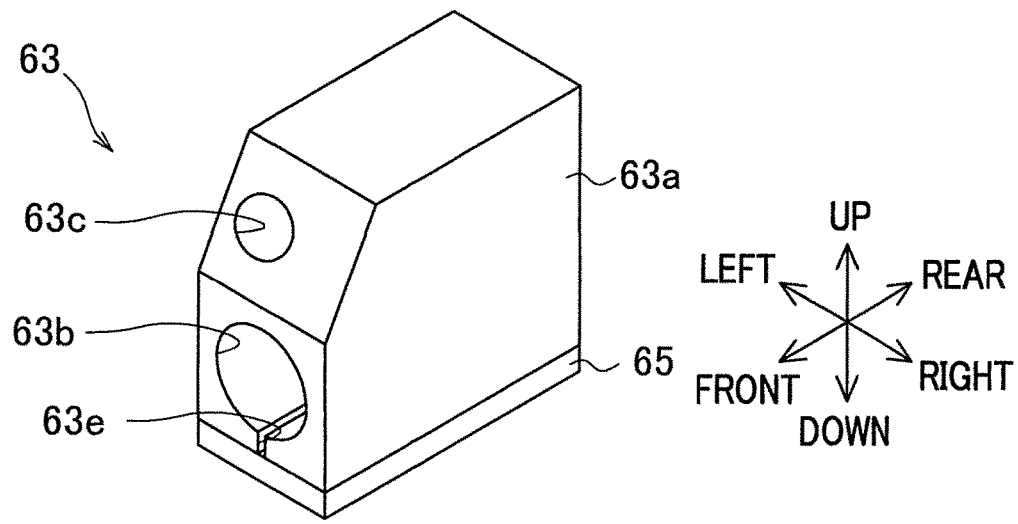
FIGS. 6A to C are explanatory views of a nozzle.
Figure 6B:
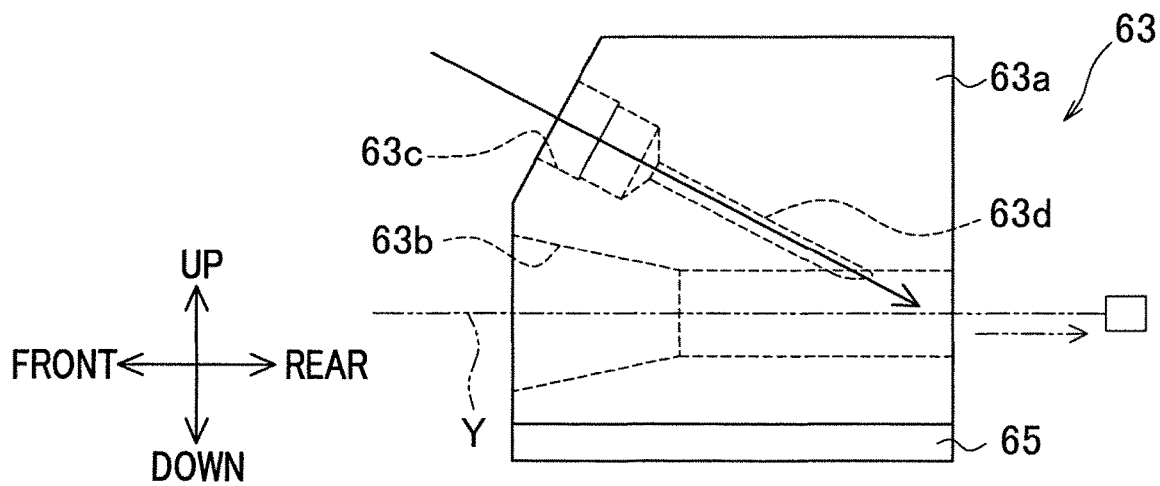
Figure 6C:
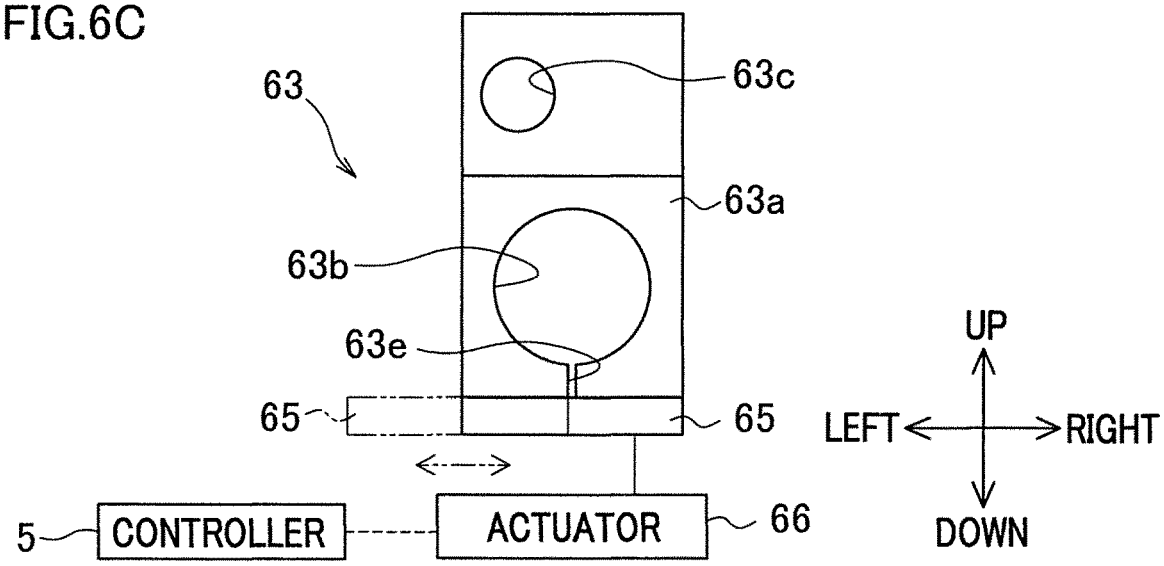

The following will describe the nozzle 63 with reference to FIGS. 6A to 6C. FIG. 6A is a perspective view of the nozzle 63. FIG. 6B is a side view of the nozzle 63. FIG. 6C shows the nozzle 63 from the upstream side in the standard thread running direction. The direction in FIGS. 6A to 6C will be referred to as a front-rear direction, a left-right direction, and an up-down direction for convenience of explanation. These directions are indicated for explanation of the nozzle 63. Note that these directions do not always correspond to the front-rear direction, the left-right direction, and the up-down direction in FIG. 1 and the like.

The nozzle 63 blows the standard thread Y with compressed air in our structure), for example. The nozzle 63 includes a nozzle main body 63a. The nozzle main body 63a is a member in substantially a rectangular parallelepiped shape, for example. In a lower portion of the nozzle main body 63a, a through hole 63b is formed to penetrate the nozzle main body 63a in the front-rear direction. In addition, on an upper front end portion of the nozzle main body 63a, an attaching hole 63c is formed to which an end portion of a pipe (not illustrated) connected to a compressed air source (not illustrated) for supply of the compressed air is attached. In the nozzle main body 63a, a communication hole 63d is formed to cause a rear side portion of the through hole 63b to be in communication with the attaching hole 63c (see FIG. 6B). Through the attaching hole 63c and the communication hole 63d, the compressed air is supplied into the through hole 63b (see full-line arrows in FIG. 6B), whereby negative pressure is generated in the through hole 63b. When the standard thread Y is inserted into the through hole 63b from a front side, the standard thread Y is blown rearwardly (see two-dot chain line arrows in FIG. 6B).

Below the through hole 63b of the nozzle main body 63a, a slit 63e is formed for communication between the through hole 63b and the exterior along an entire length of the nozzle main body 63a in the front-rear direction (see FIGS. 6A, 6C). The slit 63e is formed, whereby the standard thread Y guided to the liner L is drawable from inside of the through hole 63b.

Moreover, below the main body 63a, a nozzle lid 65 is arranged for closing the slit 63e. The nozzle lid 65 is movable between a close position (see full lines in FIG. 6C) where the slit 63e is closed and an open position (see two-dot chain lines in FIG. 6C) where the slit 63e is open. The nozzle lid 65 is moved by an actuator 66, for example (see two-dot chain line arrows in FIG. 6C). The actuator 66 is electrically connected to the controller 5. If the nozzle lid 65 is in the close position, the standard thread Y within the through hole 63b is prevented from being drawn out from the through hole 63b via the slit 63e, and also leakage of compressed air is prevented. As a result, stable supply of the standard thread Y is obtainable. If the nozzle lid 65 is in the open position, the standard thread Y within the through hole 63b is drawable via the slit 63e.

The guide tubes 64 will be described. The guide tubes 64 are used to guide the standard thread Y, blown by the nozzles 63, to the downstream side in the yarn running direction. The guide tubes 64 are each a hollow-shaped member, and capable of inserting the standard thread Y therethrough. Moreover, each of the guide tubes 64 includes a slit 64b (see FIG. 7C) adjacent to which a guide lid 67 (see FIG. 7C) is arranged, which is to be described later in detail.

The guide tubes 64 include linear one and curved one. The guide tubes 64 include one whose position is fixed and movable one. The following describes examples of the guide tubes 64 each corresponding to the element on the fiber bundle guide channel 50.

Fiber Bundle Guiding Member

Figure 7A:
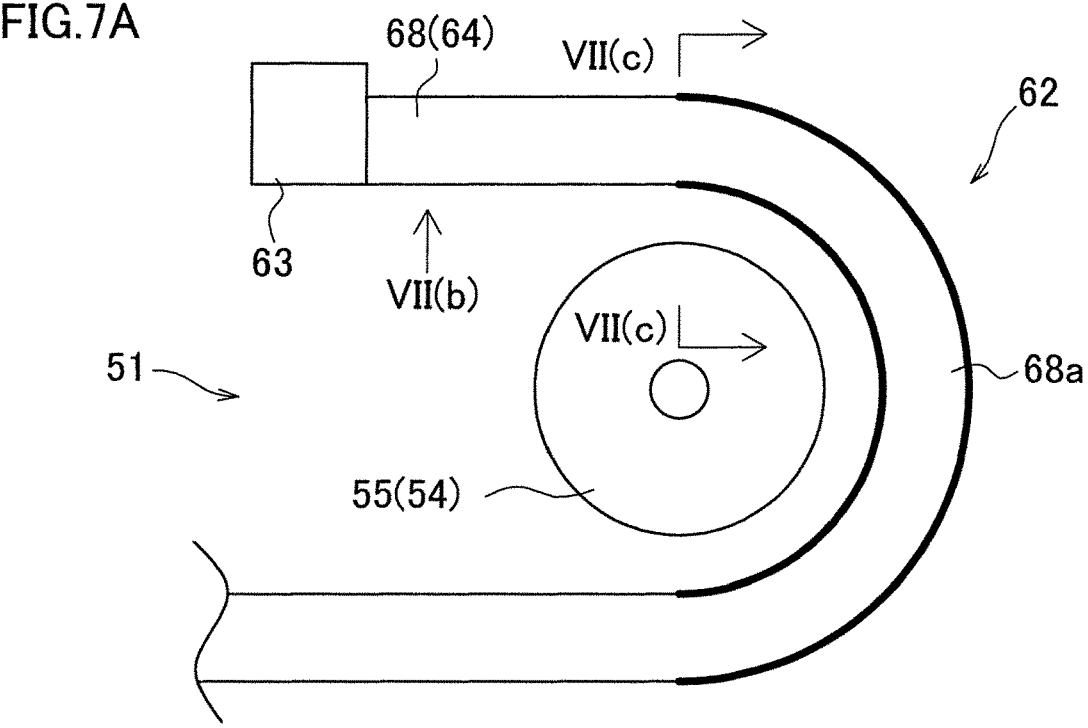
FIGS. 7A to 7C are explanatory views of a fiber bundle guide unit, a guide tube, and their surroundings.
Figure 7B:
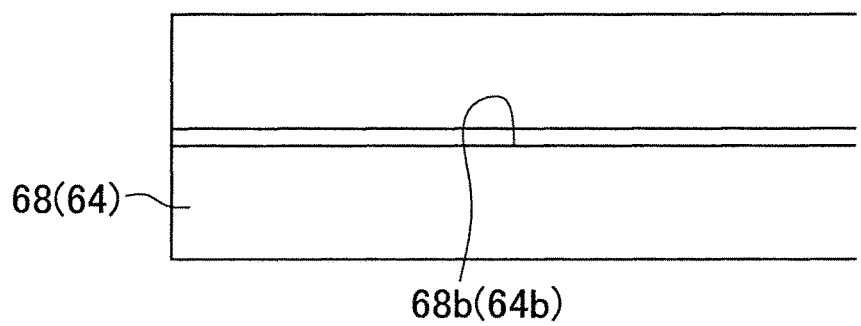
Figure 7C:
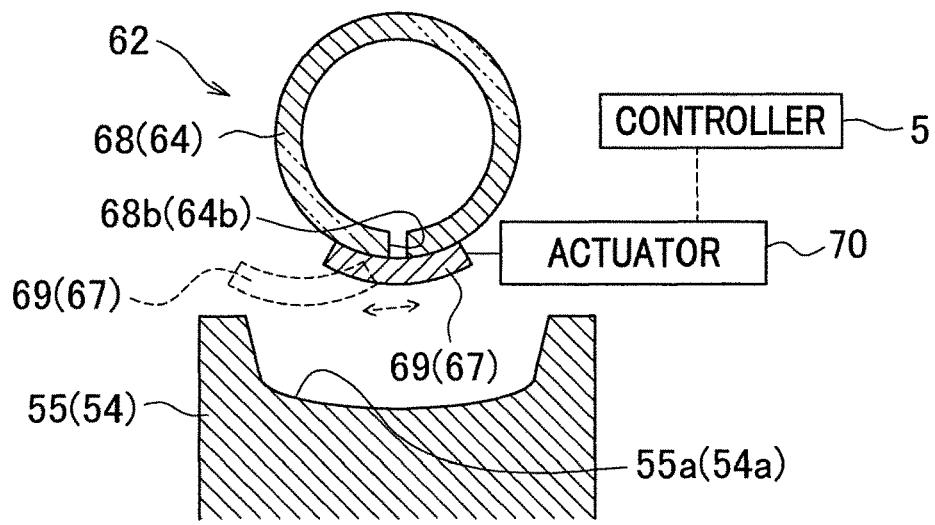

First, the following describes one example of the guide tube 64 adjacent to the fiber bundle guiding member 51 with reference to FIGS. 7A to 7C. FIG. 7A shows the guide roller 54 and the guide tube 64 arranged along the guide roller 54 seen from an axial direction of the guide roller 54. FIG. 7B shows only the guide tube 64 seen from a direction along the arrow VII(b). FIG. 7C is a cross section taken along a line VII(c)-VII(c) in FIG. 7A.

As described above, the fiber bundle guiding member 51 includes a plurality of guide rollers 54. As shown in FIG. 7A, a guide tube 68 as one example of the guide tubes 64 is provided adjacent to the guide roller 55 as one of the guide rollers 54. The guide tube 68 is provided along the circumferential surface 55a of the guide roller 55 (see FIG. 7C) and has a curved portion 68a (see thick lines in FIG. 7A). The upstream end portion of the guide tube 68 is connected to the nozzle 63.

The guide tube 68 includes a slit 68b formed therein (see FIGS. 7B, 7C) along its entire length in a direction where the guide tube 68 extends (extending direction). The slit 68b is formed, whereby the standard thread Y guided to the liner L is drawable from inside of the guide tube 68. In the guide tube 68 provided along the circumferential surface 55a of the guide roller 55, the slit 68b faces the circumferential surface 55a (see FIG. 7C).

Moreover, the standard thread guiding mechanism 62 includes a guide lid 69 (see FIG. 7C) configured to close the slit 68b. The guide lid 69 is movable between a close position (see full lines in FIG. 7C) where the slit 68b is closed and an open position (see broken lines in FIG. 7C) where the slit 68b is open. The guide lid 69 is moved by an actuator 70, for example (see broken line arrows in FIG. 7C). The actuator 70 is electrically connected to the controller 5. If the guide lid 69 is in the close position, the standard thread Y within the guide tube 68 is prevented from being drawn out from the guide tube 68 via the slit 68b, and also leakage of compressed air is prevented. As a result, stable supply of the standard thread Y is obtainable. If the guide lid 69 is in the open position, the standard thread Y within the guide tube 68 is drawable via the slit 68b.

The above description is one example of the guide tubes 64. That is, all the guide tubes 64 each include the slit 64b as a common item through which the standard thread Y is drawable. The standard thread guiding mechanism 62 includes the guide lids 67 movable between the close position where the slits 64b of the guide tubes 64 are closed and the open position where the slits 64b are open. The slits 64b arranged along the circumferential surfaces 54a of the guide rollers 54 face the circumferential surfaces 54a. The same applies to the following description.

If both the nozzle lids 65 and the guide lids 67 are in the open position, the standard thread Y can be drawn from the standard thread guide channel 60 via the slits 63e of the nozzles 63 and the slits 64b of the guide tubes 64, can move to the fiber bundle guide channel 50. In the standard thread guiding mechanism 62, the state where both the nozzle lids 65 and the guide lids 67 are in the close position corresponds to the regulated state. Moreover, the state where both the nozzle lids 65 and the guide lids 67 are in open position corresponds to the permissive state.

Tension Applying Unit

Next, the following describes one example of the tension applying unit 52 and the guide tube 64 adjacent thereto with reference to FIG. 8. The tension applying unit 52 applies given tension to the fiber bundle F. As shown in FIG. 8 as one example, the tension applying unit 52 includes a substrate 71 and five guide rollers 54. As for the five guide rollers 54, three fixed rollers 72, 73, 74 whose positions are fixed on the substrate 71 and two movable rollers 75, 76 configured to be movable are provided. The fixed roller 72, the movable roller 75, the fixed roller 73, the movable roller 76, and the fixed roller 74 are arranged in this order from the upstream side in the fiber bundle running direction (see full-line arrows in FIG. 8). The movable rollers 75, 76 are moved by actuators 77, 78, respectively, for example (see two-dot chain line arrows in FIG. 8). The actuators 77, 78 are electrically connected to the controller 5. During normal operation, the running path for the fiber bundle F is curved in a complicated manner by the five guide rollers 54. Then, the tension applying unit 52 includes the following structure to simplify the standard thread guide channel 60.

Also in the tension applying unit 52, the guide tubes 64 described above are provided. Specifically, as for the fixed rollers 72, 73, 74, three fixed guide tubes 82, 83, 84 whose positions are fixed are provided. Moreover, two fixed movable guide tubes 85, 86 are fixed to the movable rollers 75, 76, respectively. The movable guide tubes 85, 86 are each movable integrally with the movable rollers 75, 76. The fixed guide tubes 82, 83, 84 are arranged linearly. The upstream end portion of the fixed guide tube 82 is connected to the nozzle 63.

The movable rollers 75, 76 are each movable between a normal position where the fiber bundle F is guided while applying tension to the fiber bundle F (see full-lines in FIG. 8) and a standard thread guiding position where the movable guide tubes 85, 86 are arranged linearly along with the fixed guide tubes 82, 83, 84 (see two-dot chain lines in FIG. 8). If the movable guide tube 85 is in the standard thread guiding position, the downstream end portion (adjacent to the movable guide tube 85) of the fixed guide tube 82 faces the upstream end portion (adjacent to the fixed guide tube 82) of the movable guide tube 85, and the downstream end portion of the movable guide tube 85 faces the upstream end portion of the fixed guide tube 83. Likewise, if the movable guide tube 86 is in the standard thread guiding position, the downstream end portion of the fixed guide tube 83 faces the upstream end portion of the movable guide tube 86, and the downstream end portion of the movable guide tube 86 faces the upstream end portion of the fixed guide tube 84.

Slack Removing Unit

Figure 9:
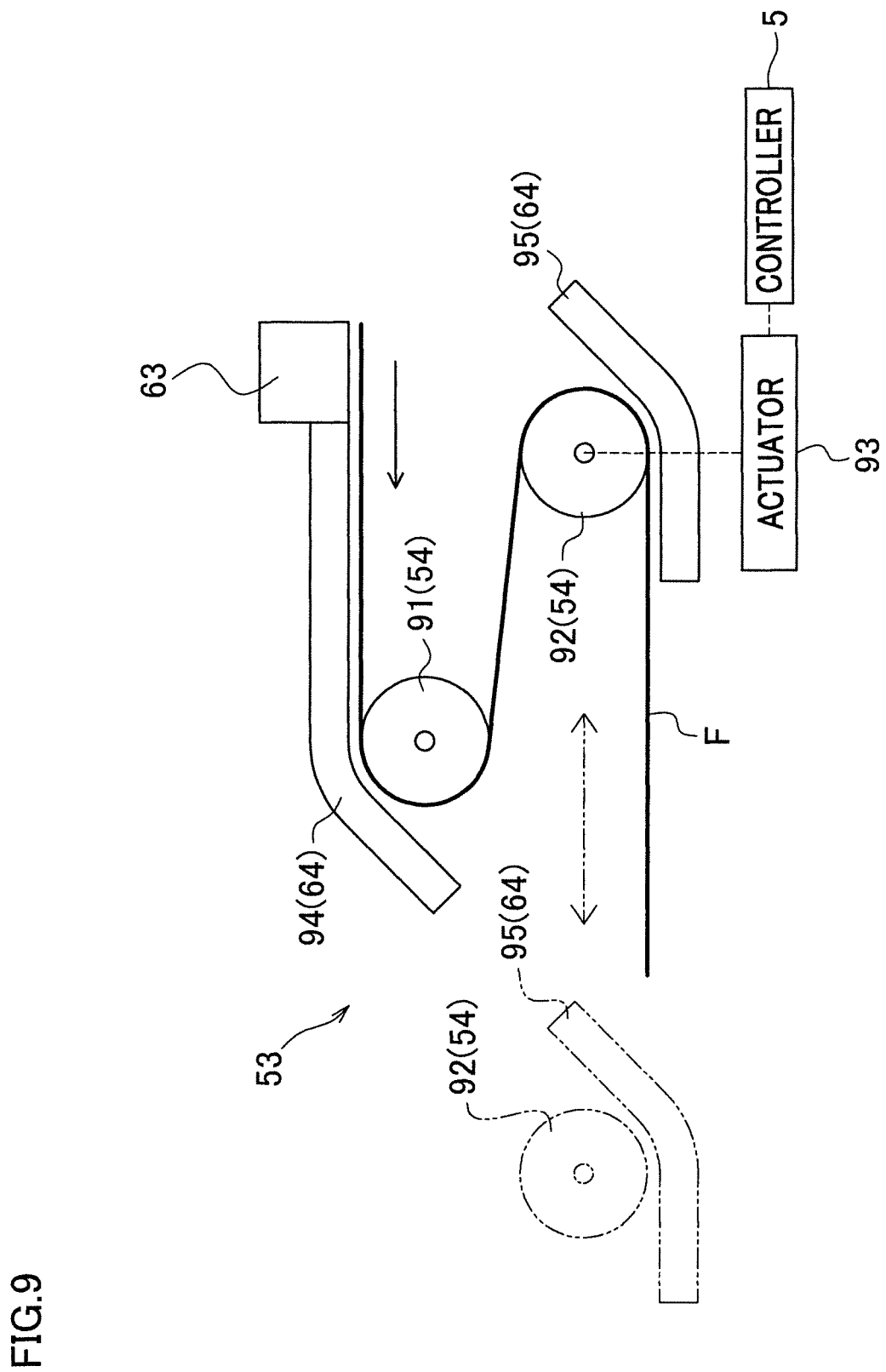
FIG. 9 is an explanatory view of a slack removing unit.

Next, the following describes the slack removing unit 53 and the guide tube 64 adjacent thereto with reference to FIG. 9. The slack removing unit 53 is capable of suppressing generation of slack in the fiber bundle F. As shown in FIG. 9, being similar to tension applying unit 52, the slack removing unit 53 includes a fixed roller 91 and a movable roller 92 as the guide rollers 54. The movable roller 92 is disposed on the downstream side of the fixed roller 91 in the fiber bundle running direction (see full-line arrow in FIG. 9). The movable roller 92 is moved by an actuator 93, for example (see two-dot chain line arrows in FIG. 9). The actuator 93 is electrically connected to the controller 5. During normal operation, the fiber bundle F is guided on the two guide rollers 54 to be in an S-shape, and hence the running path of the fiber bundle F is curved.

Accordingly, being similar to the tension applying unit 52, for the guide tubes 64, a fixed guide tube 94 adjacent to the fixed roller 91 and a movable guide tube 95 adjacent to the movable roller 92 are provided. The upstream end portion of the fixed guide tube 94 is connected to the nozzle 63. The movable roller 92 is movable between a normal position (see full lines in FIG. 9) where the fiber bundles F is guided and a standard thread guiding position (see two-dot chain lines in FIG. 9) where the standard thread Y is guidable. If the movable guide tube 95 is in the standard thread guiding position, the upstream end portion of the movable guide tube 95 faces the downstream end portion of the fixed guide tube 94.

Method of Yarn Threading

The following will describe a yarn threading method in the filament winding device 1 with reference to FIGS. 10 to 18. FIG. 10 is a flowchart illustrating a series of the yarn threading method. Appropriate description will be given as necessarily to the other drawings.

The following describes an initial state before the yarn threading operation is performed. The fiber bundles F are not drawn from the bobbins B at all, and are not disposed on the fiber bundle guide channel 50. The nozzle lids 65 and the guide lids 67 of the standard thread guiding mechanism 62 are both in the close position. The movable rollers 75, 76 of the tension applying unit 52 and the movable roller 92 of the slack removing unit 53 are in the standard thread guiding position (see FIGS. 11A, 11B). Accordingly, the guide tubes 64 are arranged linearly on the standard thread guide channel 60. The standard thread buffer 61 collects the standard thread Y longer than the standard thread guide channel 60. One end portion of the standard thread Y is connected to the fiber bundle F (see FIG. 12A). The compressed air is supplied to the nozzles 63.

Figure 12A:
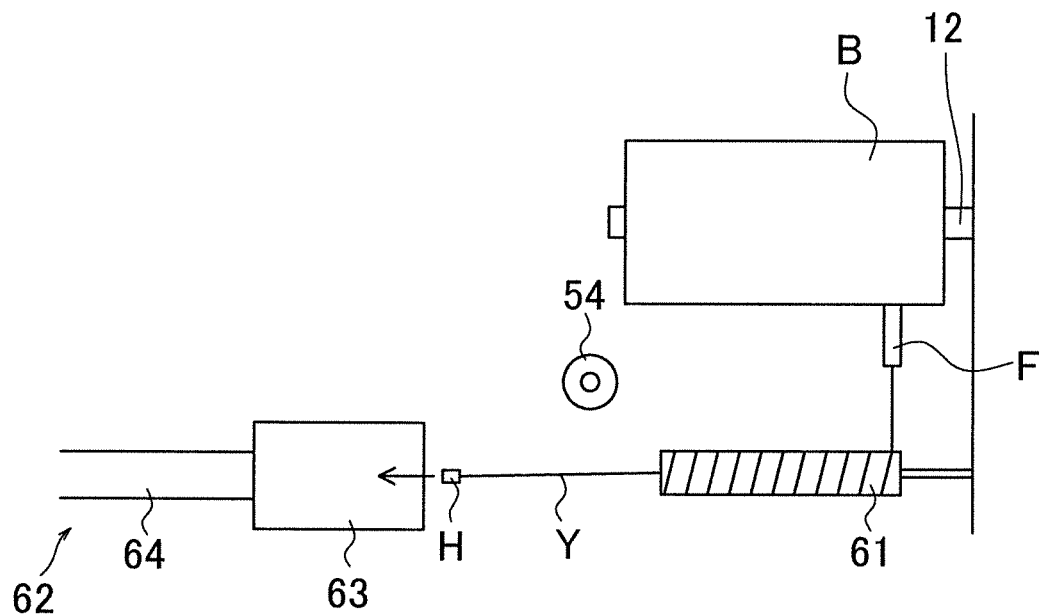
FIGS. 12A and 12B are explanatory views of a state where a standard thread is blown by the nozzle.
Figure 12B:
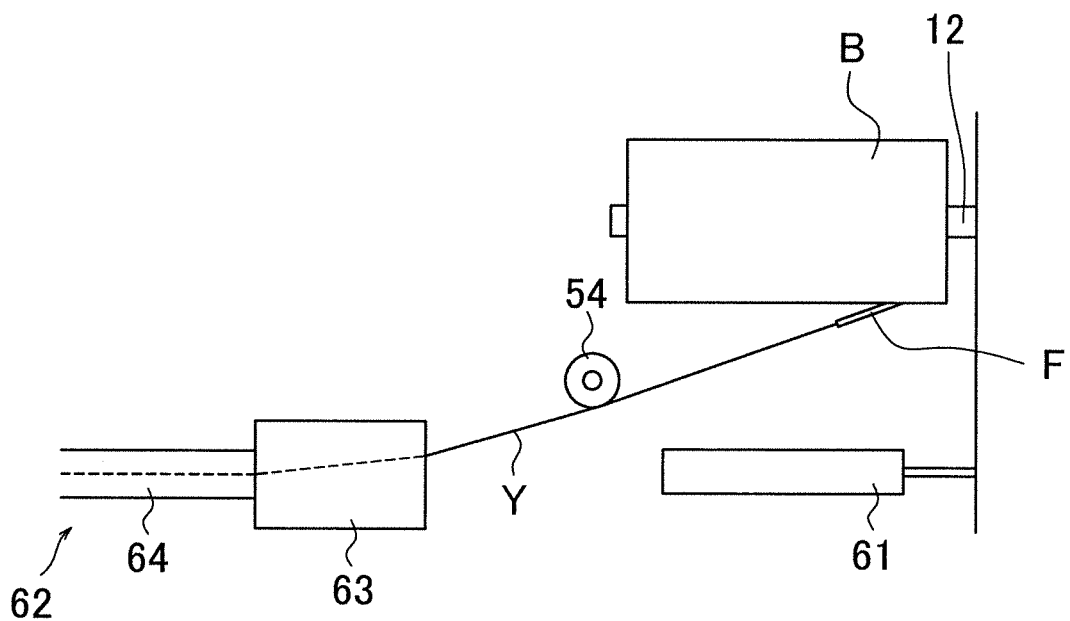

First, as shown in FIG. 12A, an operator inserts the other end portion (end portion where the head H is connected) of the standard thread Y into the nozzle 63 on the uppermost stream side of the standard thread guiding mechanism 62, and causes the nozzles 63 and the guide tubes 64 to blow the standard thread Y to be guided adjacent to the liner L (standard thread guiding step S201). At this time, as described above, since the movable roller 75 and the like are in the standard thread guiding position (see FIGS. 11A, 11B), the standard thread Y is guided smoothly within the guide tubes 64 in also the tension applying unit 52 and the slack removing unit 53. Moreover, since the nozzle lids 65 and the guide lids 67 are in the close position, the standard thread Y is prevented from being drawn out from the standard thread guide channel 60. After the standard thread Y is guided adjacent to the liner L, the standard thread Y is completely unwound from the standard thread buffer 61 as shown in FIG. 12B. On the other hand, the bobbins B are heavy and thus are unlikely to be driven to rotate, leading to less unwind of the fiber bundle F from the bobbins B.

Figure 13:
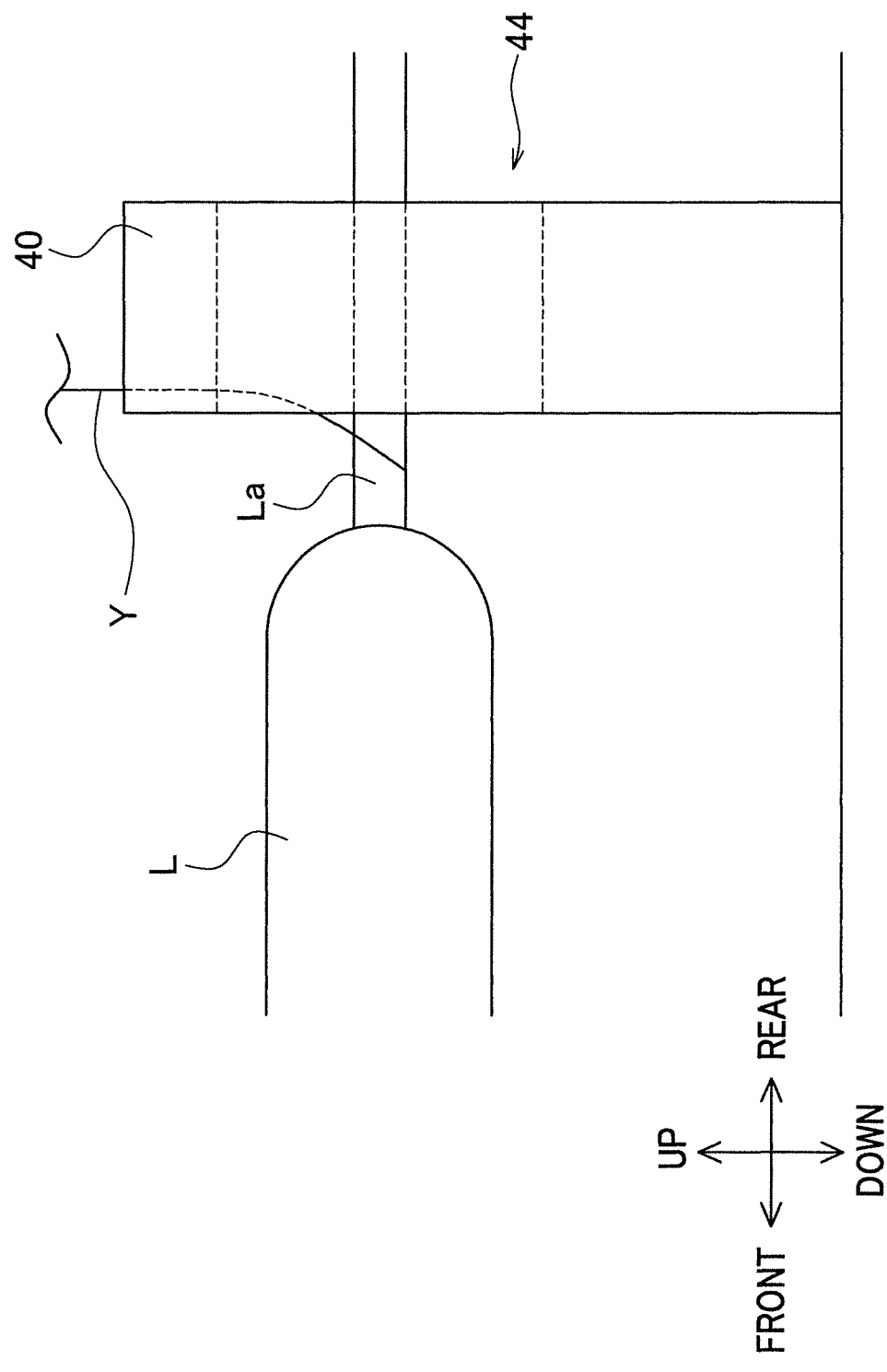
FIG. 13 is an explanatory view of a state where the standard thread reaches a liner.

Thereafter, an operator fixes the end portion of the standard thread Y, guided adjacent to the liner L, onto the liner L (S202) as shown in FIG. 13. The head H connected to the standard thread Y may be removed from the standard thread Y in this stage. The standard thread Y may be fixed on a small-diameter cap La of the liner L, for example. In this manner, the standard thread Y is wound onto the cap La and the fiber bundle F is guided to the cap La, whereby helical winding can be started, which is to be described later.

Figure 14A:
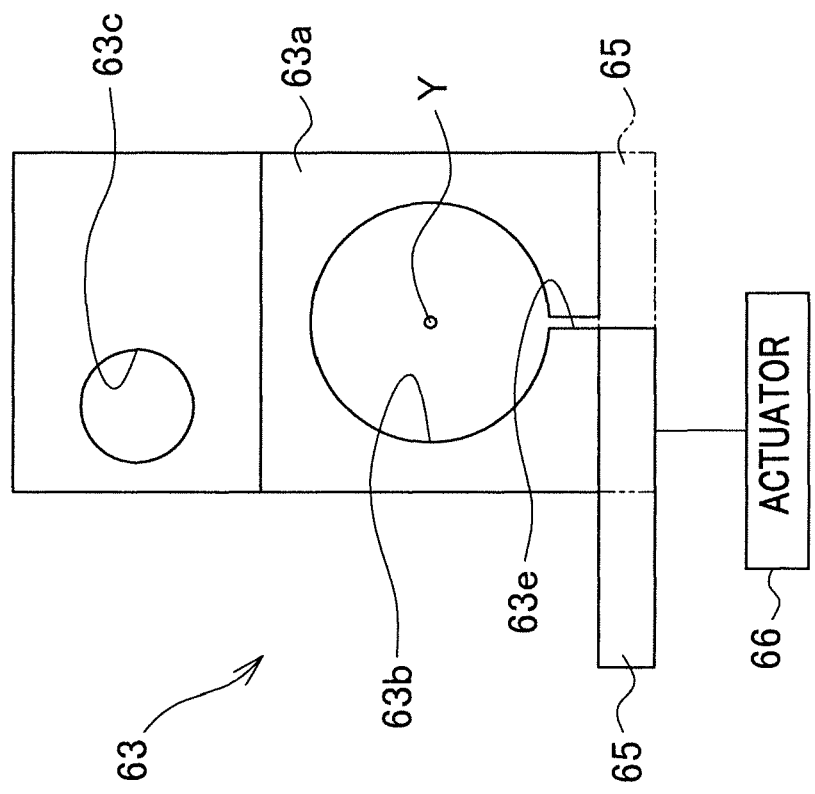
FIGS. 14A and 14B are explanatory views of a state where a lid of the nozzle and a lid of the guide tube are open.
Figure 14B:
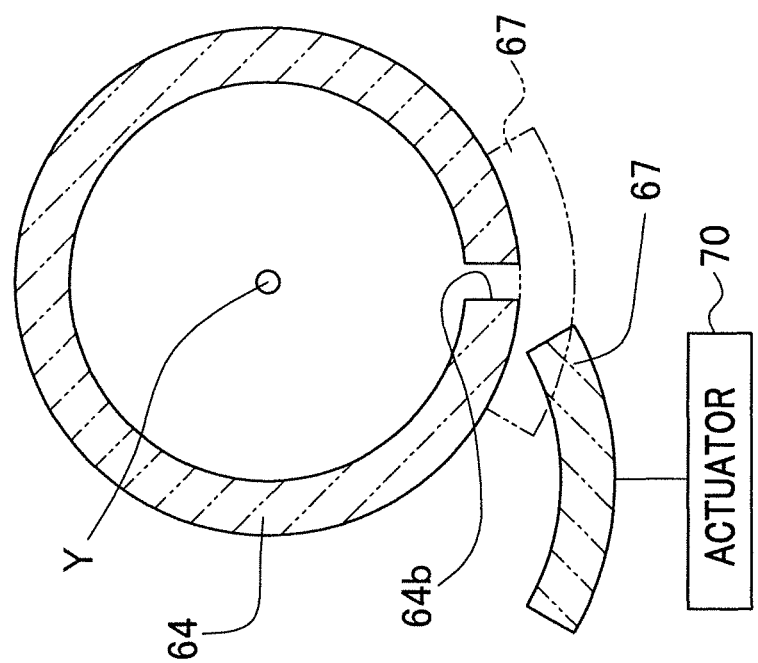

Next, the operator operates the operation unit 7 of the control panel 4 (see FIG. 1), thereby causing the controller 5 to drive the actuators 66, 70 (see FIGS. 14A and 14B). FIG. 14A shows a condition where the nozzle lid 65 is in the open position, whereas FIG. 14B shows a condition where the guide lid 67 is in the open position. That is, the operator drives the actuators 66, 70 to shift the nozzle lid 65 and the guide lid 67 from the close position (each see two-dot chain lines) to the open position (each see fine lines) (S203). Accordingly, the standard thread Y is drawable from the standard thread guide channel 60 through the guide tube 63e of the nozzle 63 and the slit 64b of the guide tube 64.

Next, the operator operates the operation unit 7 of the control panel 4, thereby causing the controller 5 to drive the actuators 77, 78 (see FIG. 8) of the tension applying unit 52 and the actuator 93 (see FIG. 9) of the slack removing unit 53. That is, as shown in FIGS. 15A, 15B, the movable rollers 75, 76 of the tension applying unit 52 and the movable roller 92 of the slack removing unit 53 return from the standard thread guiding position (see two-dot chain lines) to the normal position (each see fine lines) (S204). Accordingly, the fiber bundle guide channel 50 is formed. The movable roller 75 and the like are moved, whereby some tension is applied to the standard thread Y. At this time, the nozzle lid 65 and the guide lid 67 are in the open position. Consequently, the standard thread Y is drawable from the guide tube 64 of the tension applying unit 52 and the guide tube 64 of the slack removing unit 53 via the slit 64b to the fiber bundle guide channel 50.

Figure 16:
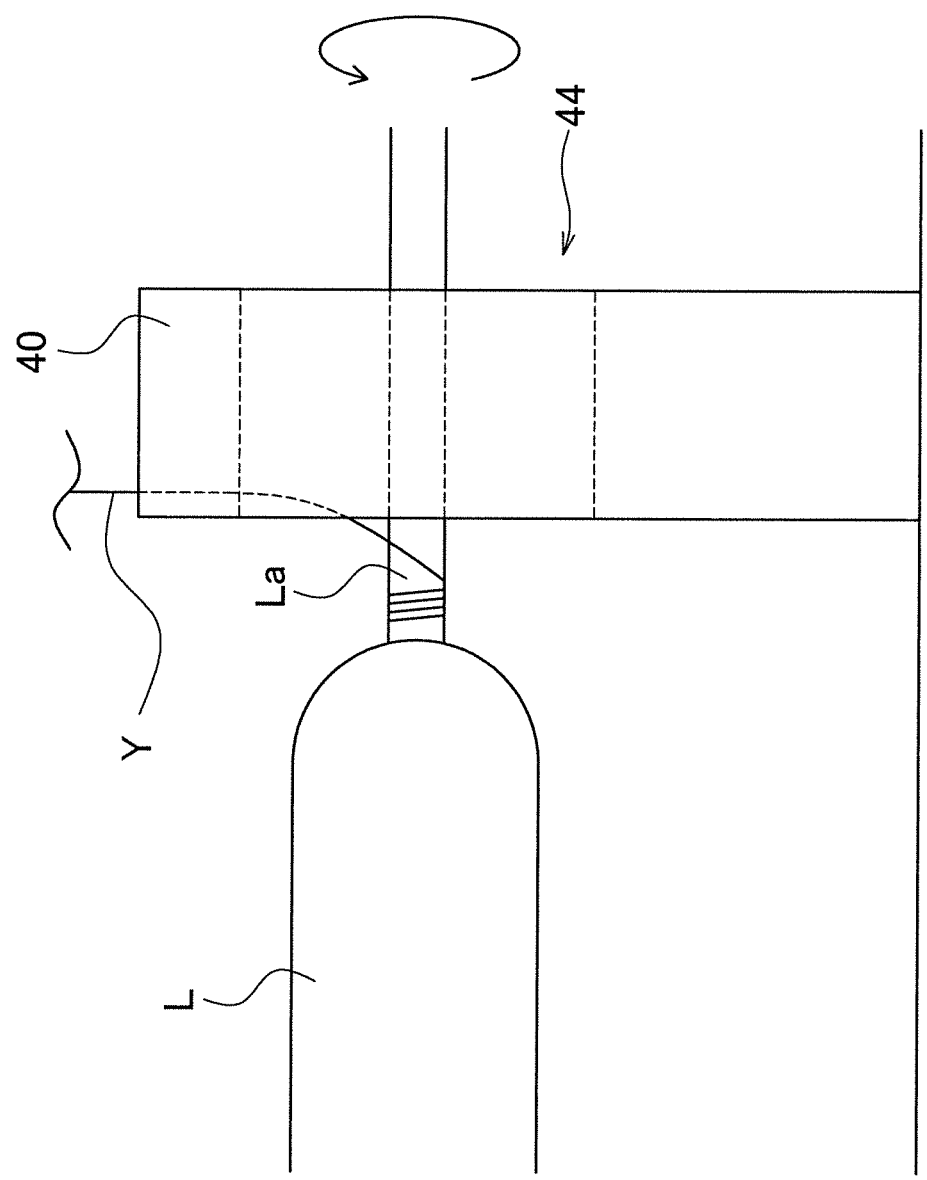
FIG. 16 is an explanatory view of a state where the standard thread is wound onto the liner.
Figure 17:
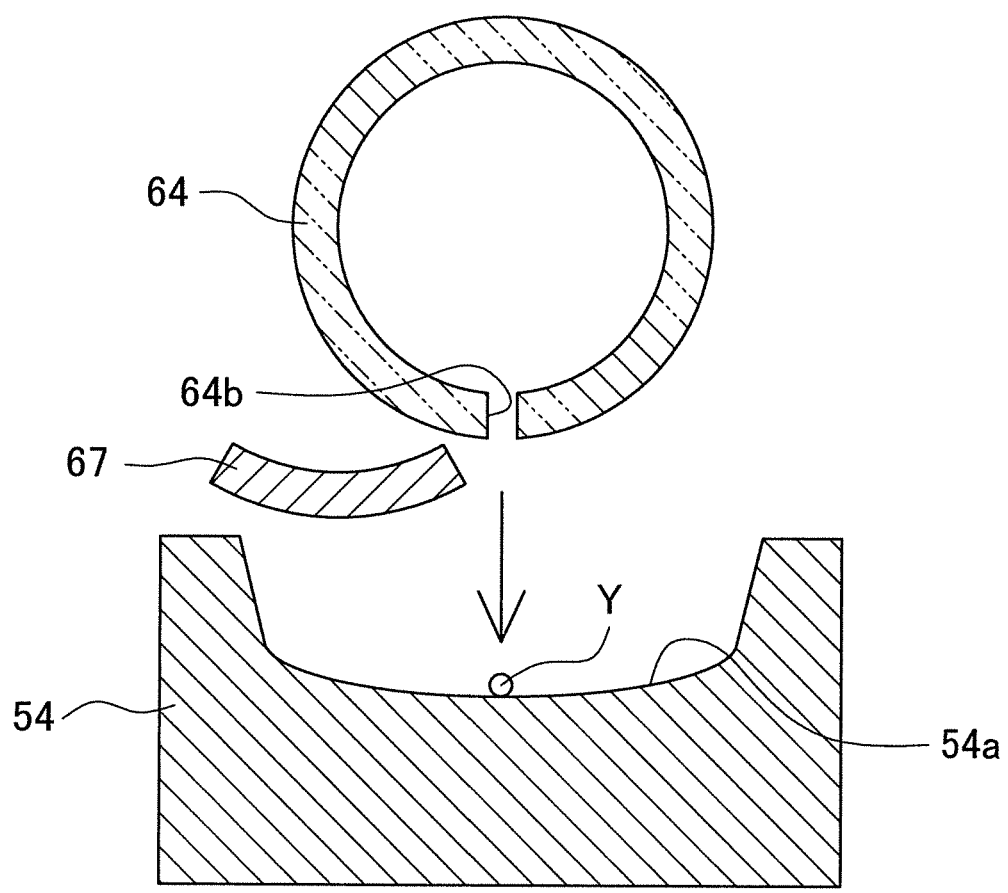
FIG. 17 is an explanatory view of movement of the standard thread from the guide tube to the roller.

Next, the operator operates the operation unit 7 of the control panel 4, thereby causing the controller 5 to drive the rotating motor 25 (see FIG. 3) of the supporting unit 20 to rotate the liner L (S205). Consequently, the standard thread Y starts being wound onto the cap La of the liner L as shown in FIG. 16. The standard thread Y is wound onto the liner L, whereby tension is applied to the standard thread Y. As a result, the standard thread Y remaining in the guide tube 64 is taken up, and the standard thread Y is moved to the circumferential surface 54a of the guide roller 54 (see FIG. 17). The tension is applied to the standard thread Y, whereby the standard thread Y is taken up also from the through hole 63b of the nozzle 63. In this manner, the standard thread Y is entirely moved from the standard thread guide channel 60 to the fiber bundle guide channel 50 (standard thread moving step).

Figure 18:
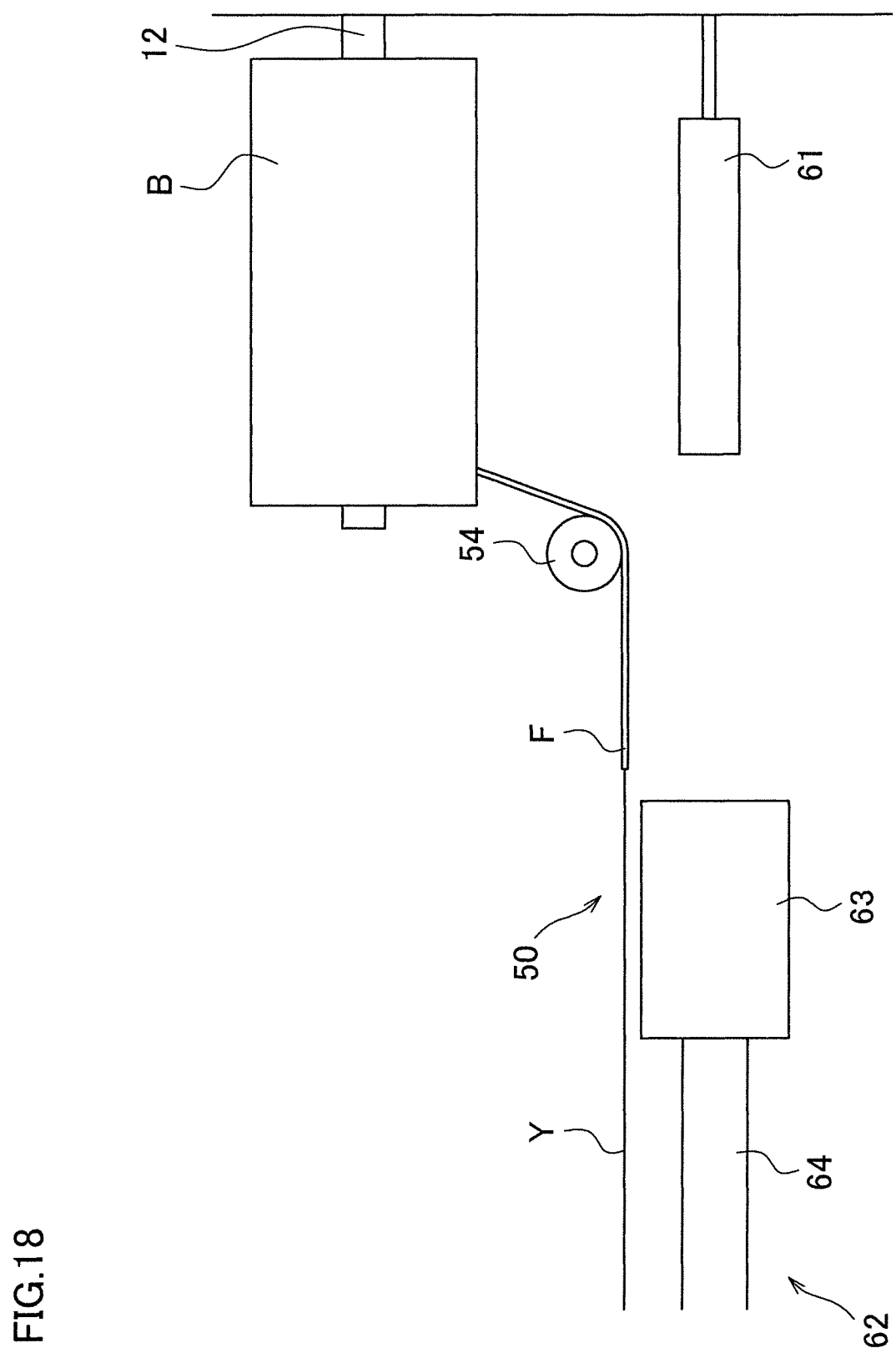
FIG. 18 is an explanatory view of surroundings of the bobbin supporter after the standard thread is moved to the fiber bundle guide channel.

The standard thread Y is wound onto the liner L, whereby a fiber bundle F connected to the standard thread Y is drawn from the bobbin B along with the standard thread moving step as shown in FIG. 18, and starts being moved to the downstream side. If the liner L rotates at excessively high speeds, the fiber bundle F may enter the nozzles 63 and the guide tubes 64 before the standard thread Y moves into the fiber bundle guide channel 50 entirely. The fiber bundle F may be damaged, for example, when the fiber bundle F enters the nozzles 63 or the guide tubes 64 or when the fiber bundle F is taken up from the nozzles 63 or the guide tubes 64. Consequently, it is preferred that a rotation speed of the liner L is controlled to move the standard thread Y entirely from the standard thread guide channel 60 to the fiber bundle guide channel 50 (i.e., the standard thread moving step is completed) before the fiber bundle F enters the nozzles 63 on the uppermost stream side, as shown in FIG. 18.

Then, when the liner L further rotates, the standard thread Y is entirely wound onto the liner L, and the fiber bundle F is drawn adjacent to the liner L (fiber bundle drawing step). That is, the rotating motor 25 also corresponds to the drawing device. As described above, one operation to rotate the liner L achieves the standard thread moving step and the fiber bundle drawing step easily and partially simultaneously.

Then, when the liner L further rotates, the drawn fiber bundle F is directly wound onto the cap La of the liner L. Thereafter, helical winding can be started as it is (S206). In this manner, the yarn threading operation is completed.

As described above, instead of the fiber bundle F, the standard thread Y connected to the fiber bundle F is guided to the liner L along the standard thread guide channel 60 through the nozzles 63 and the guide tubes 64. After the standard thread Y reaches the liner L, the standard thread Y is capable of being taken up from the standard thread guide channel 60 to be moved to the fiber bundle guide channel 50. Thereafter, the standard thread Y is pulled toward the liner L, whereby the fiber bundles F connected to the standard thread Y are capable of being drawn and guided along the fiber bundle guide channel 50 to the liner L. Consequently, this achieves reliable guidance of the fiber bundle F to the helical winding unit 40 under reduction in effort for yarn threading operation.

Moreover, the standard thread Y is fixed on the liner L supported by the supporting unit 20, and the liner L is driven rotationally by the rotating motor 25, whereby the standard thread Y is capable of being wound onto the end portion of the liner L. Accordingly, rotation of the liner L achieves drawing of the fiber bundles F connected to the standard thread Y to the liner L. Accordingly, this achieves further reduction in effort for the yarn threading operation when the fiber bundle F connected to the standard thread Y is drawn out manually. Moreover, there is no need to provide an additional device for drawing the standard thread Y and the fiber bundle F, leading to suppressed increase in cost.

Moreover, the slit 63e is formed in the nozzle main body 63a, whereby the standard thread Y guided to the liner L is drawable from the nozzle 63 with a simple structure.

Moreover, the slit 64b is formed in the nozzle tube 64, whereby the standard thread Y guided to the liner L is drawable from the guide tubes 64 with a simple structure.

Moreover, the standard thread guiding mechanism 62 is kept in the regulated state from when the standard thread Y is blown by the nozzles 63 until the standard thread Y reaches the liner L. This achieves prevention of the standard thread Y from removal of the standard thread guide channel 60. In addition, the standard thread guiding mechanism 62 is switched to the permissive state after the standard thread Y reaches the liner L. This allows the standard thread Y to be taken up from the standard thread guide channel.

Moreover, the nozzle lid 65 causes the slits 63*e* to close, thereby preventing pulling of the standard thread Y out of the nozzle 63. Moreover, the nozzle lid 65 causes the slits 63*e* to open, thereby pulling the standard thread Y out of the nozzle 63. As described above, such a simplified configuration achieves switch of the nozzles 63 between the state in which the standard thread Y is prevented from being pulled out of the nozzles 63 and the state in which the standard thread Y is capable of taking up.

Moreover, the guide lid 67 causes the slits 64*b* to close, thereby preventing pulling of the standard thread Y out of the guide tubes 64. Moreover, the guide lid 67 causes the slits 64*b* to open, thereby pulling the standard thread Y out of the guide tubes 64. As described above, such a simplified configuration achieves switch of the guide tubes 64 between the state in which the standard thread Y is prevented from being pulled out of the guide tubes 64 and the state in which the standard thread Y is capable of taking up.

Moreover, the standard thread Y is blown by the nozzles 63 while being drawn from the standard thread buffer 61. Accordingly, when the channel of the standard thread Y is formed appropriately from the standard thread buffer 61 to the nozzles 63, the standard thread Y is preventable from being caught or entangled on the member or the like therearound.

Moreover, the curved portion of the guide tube 64 (e.g., a curved portion 68*a* of the guide tube 68) is disposed along the circumferential surface 54*a* of the guide roller 54, and the standard thread Y is drawable from the position opposite to the guide roller 54. Accordingly, the standard thread Y is movable from the guide tube 64 on the standard thread guide channel 60 to the guide roller 54 on the fiber bundle guide channel 50. Consequently, this allows suppressed removal of the standard thread Y from the guide roller 54 when the standard thread Y is moved.

Moreover, the movable roller 75 and the like are moved to the standard thread guiding position together with the movable guide tube 85 and the like, whereby the end portion of the fixed guide tube 82 faces the end portion of the movable guide tube 85, for example, and the standard thread guide channel 60 is formed. Consequently, even if the fiber bundle guide channel 50 is complicated, the designed position of the movable guide tube 85 and the like achieves a simplified standard thread guide channel 60. In addition, the standard thread Y is guided to the liner L, and thereafter the movable roller 75 and the like return to the normal position, whereby the fiber bundle guide channel 50 is formed. This achieves efficient movement of the standard thread Y to the fiber bundle guide channel 50.

Moreover, since the standard thread Y is longer than the standard thread guide channel 60, the standard thread Y is guided over the standard thread guide channel 60 entirely to the liner L. Consequently, the fiber bundle F is capable of being guided to the liner L along the fiber bundle guide channel 50 without any contact to the nozzles 63 or the guide tubes 64. As a result, this achieves prevention of damages or the like on the fiber bundle F caused by contact to the nozzles 63 or the guide tubes 64. Moreover, there is no need to blow the standard thread Y together with the fiber bundle F and, accordingly, there is no need to cause the heavy bobbin B to rotate when the standard thread Y is blown. Therefore, the standard thread Y is easily reachable to the liner L by the nozzles 63.

Moreover, the standard thread Y is completely moved to the fiber bundle guide channel 50 before the fiber bundle F enters the nozzles 63, whereby the leading end of the fiber bundle F is also moved to the fiber bundle guide channel 50 together with the standard thread Y. As a result, this achieves prevention of the fiber bundle F from entering into the nozzles 63 or the guide tubes 64, leading to prevention of damages or the like on the fiber bundle F caused by contact to the nozzles 63 or the guide tubes 64.

Moreover, the standard thread Y guided to the liner L is wound, whereby the standard thread is movable from the standard thread guide channel 60 to the fiber bundle guide channel 50 while the standard thread Y is tensioned, and the fiber bundle F connected to the standard thread is drawable toward the liner L. In such a manner as above, the fiber bundle drawing step is at least partially performed along with the standard thread moving step, whereby reduction in work time is obtainable.

The following will describe modifications of the above-described example. The members identical with those in the example above will be denoted by the same reference numerals and the explanations thereof are not repeated.

(1) While in the example above the standard thread buffer 61 adjacent to the bobbin supporter 12 collects the standard thread Y, the disclosure is not limited to this arrangement. Alternatively, as shown in FIG. 19, for example, the standard thread Y may be collected by winding the standard thread Y onto an outer circumference of a bobbin B onto which the fiber bundle F is wound. In addition, a motor 96 (bobbin driving unit) may be provided for driving the bobbin B rotationally. Accordingly, the standard thread Y is capable of being blown by the nozzles 63 while the bobbin B is rotated to achieve unwind of the standard thread Y from the bobbin B. When the fiber bundles F is impregnated with resin, the outer circumferences of the fiber bundle F wound onto the bobbin B may be covered with, for example, a film, not illustrated to prevent the standard thread Y from being impregnated with the resin.

Figure 20:
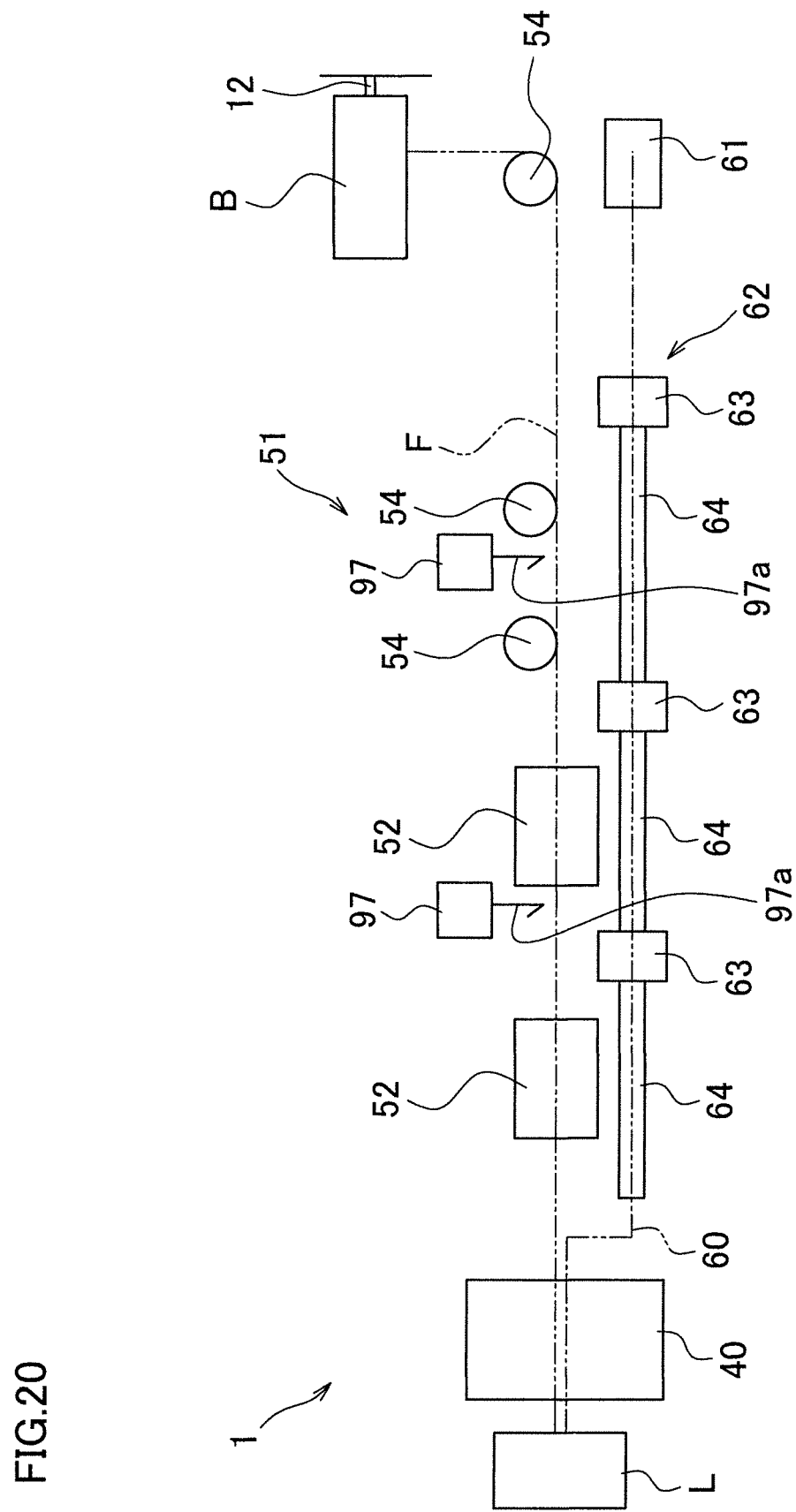
FIG. 20 is a schematic diagram showing a fiber bundle guide channel and a standard thread guide channel according to another modification.

(2) While in the example above the standard thread is tensioned by rotation of the liner L, and the standard thread Y is taken up from the standard thread guide channel 60, the disclosure is not limited to this arrangement. For instance, as shown in FIG. 20, a tension applying device 97 may be provided in midstream of the standard thread guide channel 60. The tension applying device 97 includes, for example, a telescopic hook 97*a*. In such a structure, after the standard thread Y reaches the liner L, the tension applying device 97 operates to extend the hook 97*a* in a gap between the adjacent guide tubes 64 and to hang the standard thread Y on the hook 97*a*. Moreover, the hook 97*a* contracts, whereby the standard thread Y is tensioned to be guided from the standard thread guide channel 60 to the fiber bundle guide channel 50, and thereafter the liner L rotates to draw out the fiber bundle F. Such is adoptable. In other words, the standard thread moving step may be completed before the fiber bundle drawing step starts. This achieves reliable prevention of the fiber bundle F from contact to the nozzles 63 and the guide tubes 64. Alternatively, instead of the tension applying device 97, an operator may manually move the standard thread Y from the standard thread guide channel 60 to the fiber bundle guide channel 50.

(3) While in the example above the slit 64*b* is formed in the guide tube 64, and the standard thread Y is drawable from the standard thread guide channel 60 to the fiber bundle guide channel 50, the disclosure is not limited to this arrangement. For instance, one guide tube 64 may be formed by two half tubes. In other words, the two half tubes may be coupled for prevention of the standard thread Y from removal when the standard thread Y is blown by the nozzles 63, and the two half tubes may be in a separated manner for taking up the standard thread Y to make the standard thread Y drawable. Likewise, the nozzle main body 63a may also be formed by two members.

(4) While in the example above the nozzle lid 65 closes the slit 63e and the guide lid 67 closes the slit 64b, the disclosure is not limited to this arrangement. For instance, a film may be provided on the slit instead of the nozzle lid 65 and the guide lid 67 for removing the standard thread Y due to tension in the standard thread Y. Alternatively, a width or a shape of the slit may be designed not for the standard thread Y to be removed from the standard thread guide channel 60 when the standard thread Y is blown by the nozzles 63 to omit the nozzle lid 65 and the guide lid 67.

(5) In the yarn threading operation, a robot and the like may fix the standard thread Y to the liner L instead of the operator after the standard thread Y reaches adjacent to the liner L by the nozzles 63 and the guide tubes 64. For instance, a fixing unit (not illustrated) for fixing the standard thread Y may be provided adjacent to the helical winding unit 40.

(6) In the yarn threading operation, a standard thread winding device may wind the standard thread Y instead of the liner L and the rotating motor 25 after the standard thread Y reaches adjacent to the liner L by the nozzles 63 and the guide tubes 64. In this manner, the fiber bundle F may be drawn adjacent to the liner L.

(7) In the yarn threading operation, an operator may manually move the nozzle lids 65 and the guide lids 67 to the open position, may take the standard thread Y from the standard thread guide channel 60, and may draw the fiber bundle F, for example, after the standard thread Y reaches adjacent to the liner L by the standard thread guiding mechanism 62.

(8) In the yarn threading operation, the order of the step S203 and the step S204 is switchable. In this example, when the movable roller 75 and the like return from the standard thread guiding position to the normal position, the standard thread Y remains in the guide tubes 64. Also in this example, the liner L rotates in the step S205, whereby all the standard thread Y is taken from the standard thread guide channel 60.

(9) The standard thread Y may be substantially equal to or shorter than the standard thread guide channel 60. In this example, the fiber bundle F partially enters the nozzles 63 and the like when the standard thread Y reaches adjacent to the liner L. On the other hand, when the fiber bundle F is not impregnated with the resin, for example, no resin is attached to the nozzles 63 and the guide tubes 64 if the fiber bundle F enter nozzles 63 and the guide tubes 64. In this example, it is allowable for the fiber bundles F to enter the nozzles 63 and the like.

The invention claimed is:

1. A filament winding device comprising:
a supporter configured to support a liner in a rotatable manner;
a yarn supplying unit configured to support a bobbin onto which a fiber bundle to be wound onto the liner is wound;
a helical winding head configured to helical-wind the fiber bundle onto the liner, the fiber bundle running along a fiber bundle guide channel formed from the yarn supplying unit to the liner; and
a standard thread guiding mechanism configured to form a standard thread guide channel that guides a standard thread from the bobbin to the liner, the standard thread being different from the fiber bundle and being connected to a leading end of the fiber bundle,
the standard thread guiding mechanism including a nozzle configured to blow the standard thread with use of a compressed gas, and a guide tube configured to guide the standard thread blown by the nozzle, and
the nozzle and the guide tube being disposed along the fiber bundle guide channel, and being capable of taking up the standard thread from the standard thread guide channel to the fiber bundle guide channel.

2. The filament winding device according to claim 1, further comprising: a drawing device configured to take up the standard thread from the standard thread guide channel to the fiber bundle guide channel by winding the standard thread guided to the liner, and draw out the fiber bundle, connected to the standard thread, the liner along the fiber bundle guide channel.

3. The filament winding device according to claim 2, wherein
the supporter includes a driving unit configured to drive the liner rotationally, and
the drawing device corresponds to the driving unit.

4. The filament winding device according to claim 1, wherein the nozzle includes a slit formed therein to take up the standard thread therethrough.

5. The filament winding device according to claim 1, wherein the guide tube includes a slit formed therein to extend thereover in a direction where the guide tube is provided.

6. The filament winding device according to claim 1, wherein the standard thread guiding mechanism is switchable between a regulated state in which the standard thread is prevented from being removed out of the standard thread guide channel and a permissive state in which the standard thread is allowed to be taken up from the standard thread guide channel.

7. The filament winding device according to claim 6, wherein
the nozzle includes a slit formed therein through which the standard thread is capable of being taken up, and
the standard thread guiding mechanism includes a nozzle lid with which the slit of the nozzle is closeable and openable.

8. The filament winding device according to claim 6, wherein
the guide tube includes a slit formed therein to extend over the guide tube in a direction where the guide tube is provided, and
the standard thread guiding mechanism includes a guide lid with which the slit of the guide tube is openable and closeable.

9. The filament winding device according to claim 1, further comprising:
a standard thread buffer disposed on an upstream end portion of the standard thread guide channel in a standard thread running direction and is configured to store the standard thread before the standard thread is blown by the nozzle.

10. The filament winding device according to claim 1, wherein
the standard thread is wound onto a surface of the bobbin, and
the filament winding device further includes a bobbin driving unit configured to drive the bobbin rotationally.

11. The filament winding device according to claim 1, wherein
the fiber bundle guide channel includes a guide roller configured to guide the fiber bundle,
the standard thread guiding mechanism includes the guide tube with a curved portion arranged along a circumferential surface of the guide roller, and the standard thread is drawable from a position opposite to the circumferential surface of the guide tube.

12. The filament winding device according to claim 1, wherein on the fiber bundle guide channel, a fixed roller whose position is fixed and a movable roller is disposed, the movable roller being disposed on an upstream side or a downstream side of the fixed roller in a fiber bundle running direction and being movable with respect to the fixed roller, the standard thread guiding mechanism includes a fixed guide tube whose position is fixed with respect to the fixed roller and a movable guide tube movable integrally with the movable roller, the movable roller is movable between a normal position where the fiber bundle is guided and a standard thread guiding position where an end portion of the movable guide tube adjacent to the fixed guide tube in the fiber bundle running direction faces an end portion of the fixed guide tube adjacent to the movable guide in the fiber bundle running direction, and the movable roller is moved from the standard thread guiding position to the normal position, whereby the standard thread is movable from the standard thread guide channel to the fiber bundle guide channel.

13. The filament winding device according to claim 1, wherein the standard thread has a length equal to or larger than a length of the standard thread guide channel.

14. A method of threading yarn in a filament winding device, the filament winding device including a helical winding head for helical winding of a fiber bundle onto a liner, and a supporter configured to support a bobbin where the fiber bundle to be supplied to the helical winding head is wound, wherein the threads the fiber bundle on a fiber bundle guide channel that guide the fiber bundle from the bobbin to the liner prior to winding of the fiber bundle onto the liner by the helical winding head, the method comprising:

a standard thread guiding step of guiding a standard thread, different from the fiber bundle and connected to a leading end of the fiber bundle, to the liner with a standard thread guiding mechanism including a nozzle configured to blow the standard thread by a compressed gas and a guide tube configured to guide the standard thread blown by the nozzle:

a standard thread moving step of taking up the standard thread, guided to the liner along a standard thread guide channel formed by the standard thread guiding mechanism, from the nozzle and the guide tube and moving the standard thread from the standard thread guide channel to the fiber bundle guide channel; and a fiber bundle drawing step of pulling the fiber bundle to the liner by drawing out the standard thread guided to the liner.

15. The method according to claim 14, wherein, when the standard thread is pulled toward the liner in the fiber bundle drawing step, the standard thread moving step is completed before the fiber bundle connected to the standard thread is pulled on the standard thread guide channel to enter the nozzle.

16. The method according to claim 14, wherein the fiber bundle drawing step is at least partially performed along with the standard thread moving step by winding the standard thread guided to the liner.

17. The method according to claim 14, wherein the standard thread moving step is completed before the fiber bundle drawing step is started.

* * * * *